(12) United States Patent
Eash et al.

(10) Patent No.: US 11,163,164 B2
(45) Date of Patent: Nov. 2, 2021

(54) STEERABLE HIGH-RESOLUTION DISPLAY

(71) Applicant: Avegant Corp., San Mateo, CA (US)

(72) Inventors: Aaron Matthew Eash, San Francisco, CA (US); Andrew John Gross, Redwood City, CA (US); Edward Chia Ning Tang, Menlo Park, CA (US); D. Scott Dewald, Dallas, TX (US); Joseph Roger Battelle, Belmont, CA (US); Kevin William King, San Francisco, CA (US); Warren Cornelius Welch, III, Foster City, CA (US)

(73) Assignee: Avegant Corp., San Mateo, CA (US)

( * ) Notice: Subject to any disclaimer, the term of this patent is extended or adjusted under 35 U.S.C. 154(b) by 0 days.

(21) Appl. No.: 16/726,212

(22) Filed: Dec. 23, 2019

(65) Prior Publication Data

US 2020/0133006 A1   Apr. 30, 2020

Related U.S. Application Data

(63) Continuation of application No. 15/937,770, filed on Mar. 27, 2018, now Pat. No. 10,514,546.
(Continued)

(51) Int. Cl.
*G02B 27/01* (2006.01)
*G06T 7/70* (2017.01)
(Continued)

(52) U.S. Cl.
CPC ......... *G02B 27/0172* (2013.01); *G06F 1/163* (2013.01); *G06F 3/011* (2013.01); *G06F 3/013* (2013.01); *G06F 3/147* (2013.01); *G06T 7/70* (2017.01); *G09G 3/002* (2013.01); *G09G 5/00* (2013.01); *G09G 5/026* (2013.01);
(Continued)

(58) Field of Classification Search
CPC ........ G02B 27/0172; G02B 2027/0147; G02B 2027/0178; G06K 9/00671; G06K 9/00597; G06K 9/00335; G09G 3/002; G09G 5/026; G09G 5/00; G09G 2340/10; G09G 2340/0407; G06F 3/147; G06F 3/011; G06F 3/013; G06F 1/163; G06T 7/70; G06T 2207/30004; A61B 2034/2055;
(Continued)

(56) References Cited

U.S. PATENT DOCUMENTS 4,924,522 A   5/1990   Bray et al.
5,035,500 A   7/1991   Rorabaugh et al.
(Continued)

FOREIGN PATENT DOCUMENTS

WO   2018019831 A1   2/2018

OTHER PUBLICATIONS

U.S. Appl. No. 15/937,770, filed Mar. 27, 2018, Aaron Matthew Eash.
(Continued)

*Primary Examiner* — Darlene M Ritchie
(74) *Attorney, Agent, or Firm* — Nicholson De Vos Webster & Elliott LLP; Judith Szepesi

(57) ABSTRACT

A display system comprising a foveal display having a monocular field of view of at least 1 degree is positioned within a scannable field of view of at least 20 degrees, the foveal display positioned for a user. In one embodiment, the foveal display is positioned for the user's fovea.

17 Claims, 34 Drawing Sheets

Related U.S. Application Data

(60) Provisional application No. 62/575,354, filed on Oct. 20, 2017, provisional application No. 62/477,404, filed on Mar. 27, 2017.

(51) Int. Cl.

| | | |
|---|---|---|
| *G06F 3/01* | (2006.01) | |
| *G06F 1/16* | (2006.01) | |
| *G09G 5/00* | (2006.01) | |
| *G06F 3/147* | (2006.01) | |
| *G09G 5/02* | (2006.01) | |
| *G09G 3/00* | (2006.01) | |
| *G06K 9/00* | (2006.01) | |

(52) U.S. Cl.
CPC .......... *G02B 2027/0123* (2013.01); *G02B 2027/0147* (2013.01); *G02B 2027/0178* (2013.01); *G06K 9/00597* (2013.01); *G06K 9/00671* (2013.01); *G09G 2340/0407* (2013.01); *G09G 2340/10* (2013.01)

(58) Field of Classification Search
CPC ....... A61B 34/20; A61B 34/25; A61B 90/361; A61B 5/7445; A61B 5/742; A61B 5/743
See application file for complete search history.

(56) References Cited

U.S. PATENT DOCUMENTS

| | | | |
|---|---|---|---|
| 6,008,781 | A | 12/1999 | Furness et al. |
| 6,097,353 | A | 8/2000 | Melville et al. |
| 6,353,503 | B1 | 3/2002 | Spitzer et al. |
| 6,356,392 | B1 | 3/2002 | Spitzer |
| 7,786,648 | B2 | 8/2010 | Xu et al. |
| 9,128,281 | B2 | 9/2015 | Osterhout et al. |
| 9,335,548 | B1 | 5/2016 | Cakmakci et al. |
| 9,588,408 | B1 | 3/2017 | Linnell |
| 9,710,887 | B1 | 7/2017 | Sahlsten et al. |
| 9,711,072 | B1 | 7/2017 | Konttori et al. |
| 9,711,114 | B1 | 7/2017 | Konttori et al. |
| 9,779,478 | B1 | 10/2017 | Wilson et al. |
| 9,972,071 | B2 | 5/2018 | Wilson et al. |
| 10,140,695 | B2 | 11/2018 | Wilson et al. |
| 10,284,118 | B2 | 5/2019 | Henderson et al. |
| 10,514,546 | B2 | 12/2019 | Eash et al. |
| 2008/0015553 | A1 | 1/2008 | Zacharias |
| 2009/0122385 | A1 | 5/2009 | Hilton |
| 2009/0160872 | A1 | 6/2009 | Gibbons |
| 2010/0097580 | A1 | 4/2010 | Yamamoto et al. |
| 2010/0149073 | A1 | 6/2010 | Chaum et al. |
| 2010/0231706 | A1 | 9/2010 | Maguire, Jr. |
| 2011/0075257 | A1 | 3/2011 | Hua et al. |
| 2011/0141225 | A1 | 6/2011 | Stec et al. |
| 2012/0154277 | A1 | 6/2012 | Bar-Zeev et al. |
| 2012/0176483 | A1 | 7/2012 | Border et al. |
| 2013/0208330 | A1 | 8/2013 | Naono |
| 2013/0286053 | A1* | 10/2013 | Fleck .............. G09G 5/377 345/690 |
| 2015/0201171 | A1 | 7/2015 | Takehana |
| 2015/0247723 | A1 | 9/2015 | Abovitz et al. |
| 2015/0287165 | A1 | 10/2015 | Berghoff |
| 2016/0065921 | A1 | 3/2016 | Sieler et al. |
| 2016/0209648 | A1 | 7/2016 | Haddick et al. |
| 2016/0225192 | A1 | 8/2016 | Jones et al. |
| 2016/0233793 | A1 | 8/2016 | Henderson et al. |
| 2016/0240013 | A1 | 8/2016 | Spitzer |
| 2016/0260258 | A1 | 9/2016 | Lo et al. |
| 2016/0262608 | A1 | 9/2016 | Krueger |
| 2016/0274365 | A1 | 9/2016 | Bailey et al. |
| 2016/0363841 | A1 | 12/2016 | Hino et al. |
| 2017/0083084 | A1 | 3/2017 | Tatsuta et al. |
| 2017/0124760 | A1 | 5/2017 | Murakawa et al. |
| 2017/0188021 | A1 | 6/2017 | Lo et al. |
| 2017/0245753 | A1 | 8/2017 | Donaldson |
| 2017/0255012 | A1 | 9/2017 | Tam et al. |
| 2017/0255020 | A1 | 9/2017 | Tam et al. |
| 2017/0263046 | A1 | 9/2017 | Patney et al. |
| 2017/0287447 | A1 | 10/2017 | Barry et al. |
| 2017/0316601 | A1 | 11/2017 | Kakarlapudi et al. |
| 2017/0318235 | A1 | 11/2017 | Schneider et al. |
| 2018/0136471 | A1 | 5/2018 | Miller et al. |
| 2018/0183356 | A1 | 6/2018 | Henderson et al. |
| 2018/0227630 | A1 | 8/2018 | Schmidt et al. |
| 2018/0269266 | A1 | 9/2018 | Olmo et al. |
| 2018/0275410 | A1* | 9/2018 | Yeoh .............. H04N 13/398 |
| 2018/0284451 | A1 | 10/2018 | Eash et al. |
| 2018/0293061 | A1 | 10/2018 | Harviainen |
| 2018/0321484 | A1* | 11/2018 | Bailey .............. G02B 27/30 |
| 2018/0344413 | A1 | 12/2018 | Rappel et al. |

OTHER PUBLICATIONS

Extended European Search Report (includes supplementary European search report and European search opinion), EP 18775536.8, dated Apr. 9 2020, 7 pages.
PCT International Search Report dated Jun. 8, 2018 (2 pages).
PCT International Written Opinion dated Jun. 8, 2018 (6 pages).

* cited by examiner

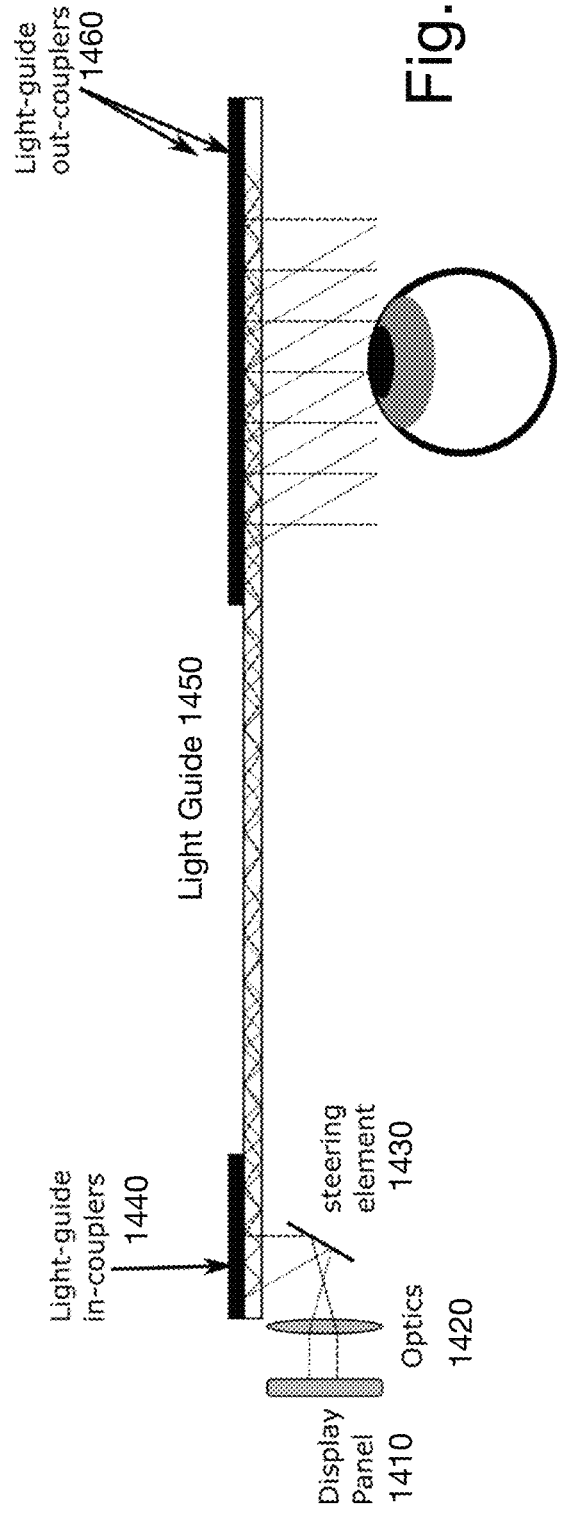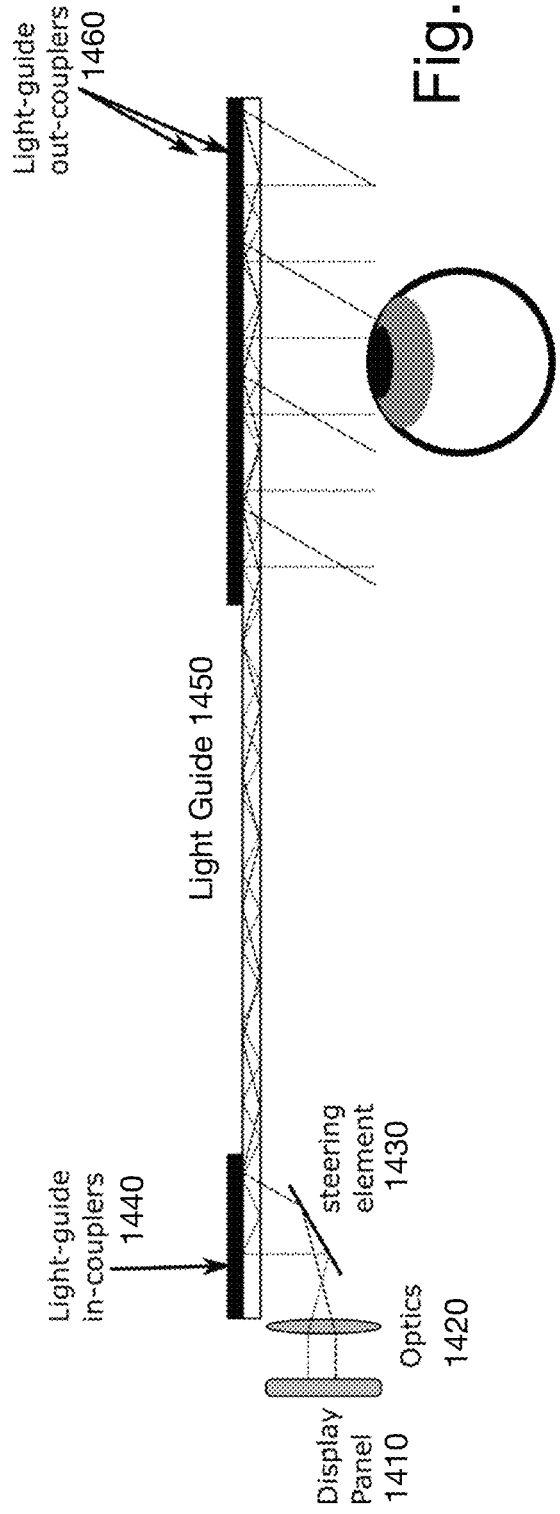

| EYE MOVEMENT | PREDICTIVE EFFECT |
|---|---|
| Fixated | Do not move display, push resolution and level of detail to maximum |
| Blink | User image processing is off, movement of eye is unknown, display does not need output frame and therefore an opportunity exists to catch up with the movement and/or the render pipeline if needed |
| Micro-Saccade | Eye is moving fast but will likely return to nearly the previous gaze center. Do not move display. |
| Slow Pursuit | Case 1: No information about the content the user is tracking is available, regardless of whether they are tracking a real world or virtual object. Keep moving the display continuously or in small steps, anticipating continued motion along the current eye movement.<br><br>Case 2: Information about virtual object(s) being tracked is known. Combine the current eye movement velocity vector with knowledge of how the content is moving to optimize display motion.<br><br>Case 3: Vestibular ocular reflex, eyes moving due to head movement. Combine data from head movement data with eye data, to move display. |
| Fast Movement/Saccade | User image processing is off or has reduced recognition of resolution or level of detail. Move display, and optionally reduce data position validation requirements. Optionally reduce level of detail to minimize load on render pipeline, stop displaying multiple focal planes because user is not sensitive to |

Fig. 21

STEERABLE HIGH-RESOLUTION DISPLAY

RELATED APPLICATION

The present application is a continuation of U.S. patent application Ser. No. 15/937,770, filed on Mar. 27, 2018, issuing as U.S. Pat. No. 10,514,546 issuing on Dec. 24, 2019, which in turn claims priority to U.S. Provisional Application No. 62/477,404, filed on Mar. 27, 2017, and U.S. Provisional Application No. 62/575,354, filed on Oct. 20, 2017, and incorporates all of the above applications in their entirety.

BACKGROUND

Near-eye displays have the competing requirements of displaying images at a high resolution, over a large field of view (FOV). For many applications in virtual and augmented reality, the field of view should be greater than 90 degrees, and ideally the binocular field of view would extend past 180 degrees. At the same time, the resolution of the display should match that of the human visual system so that little or no pixelation is perceived in the virtual images. Combining these two requirements in a single system presents a number of challenges. To avoid the appearance of pixelation, the resolution needs to be on the order of 0.01-0.02 degrees per pixel. Over a 90-degree square field of view, this corresponds to 4.5 k×4.5 k pixels per eye or higher. Achieving such resolutions is challenging at the level of the panel, the drive electronics, and the rendering pipeline.

Additionally, optical systems that can project wide FOV images to the user with sufficiently high resolution over the entire field of view are also difficult to design. Systems architectures that are able to present the user with high resolution images over a wide field of view, while simultaneously reducing the rendering, data rate, and panel requirements will enable new applications for augmented and virtual reality systems.

LIST OF FIGURES

The present invention is illustrated by way of example, and not by way of limitation, in the figures of the accompanying drawings and in which like reference numerals refer to similar elements and in which:

FIGS. 14A and 14B are an illustration of one embodiment of a foveal display using a waveguide which may be used in the systems above.

FIG. 21 is a table of exemplary types of eye movements.

DETAILED DESCRIPTION

Figure 1A:
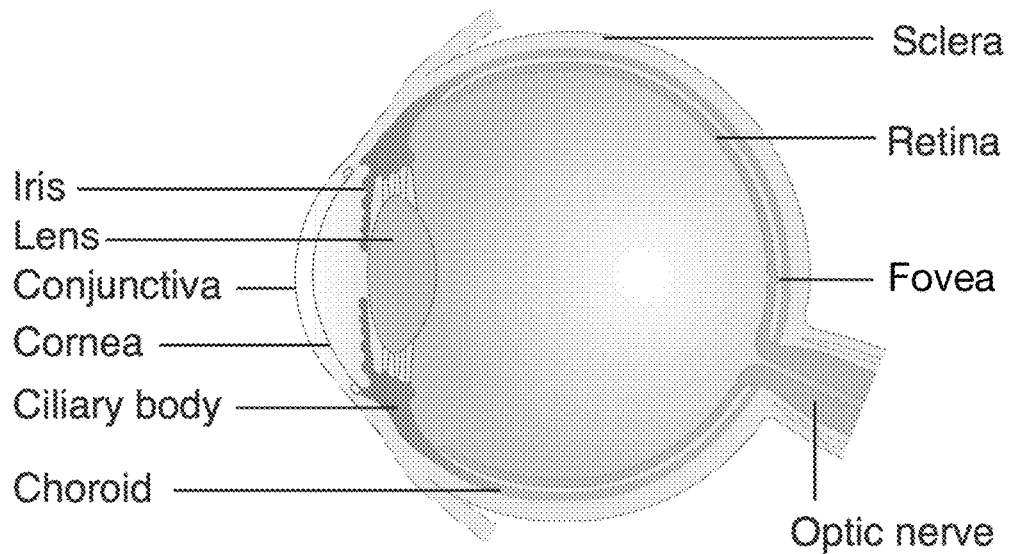
FIG. 1A illustrates an eye showing the fovea.
Figure 1B:
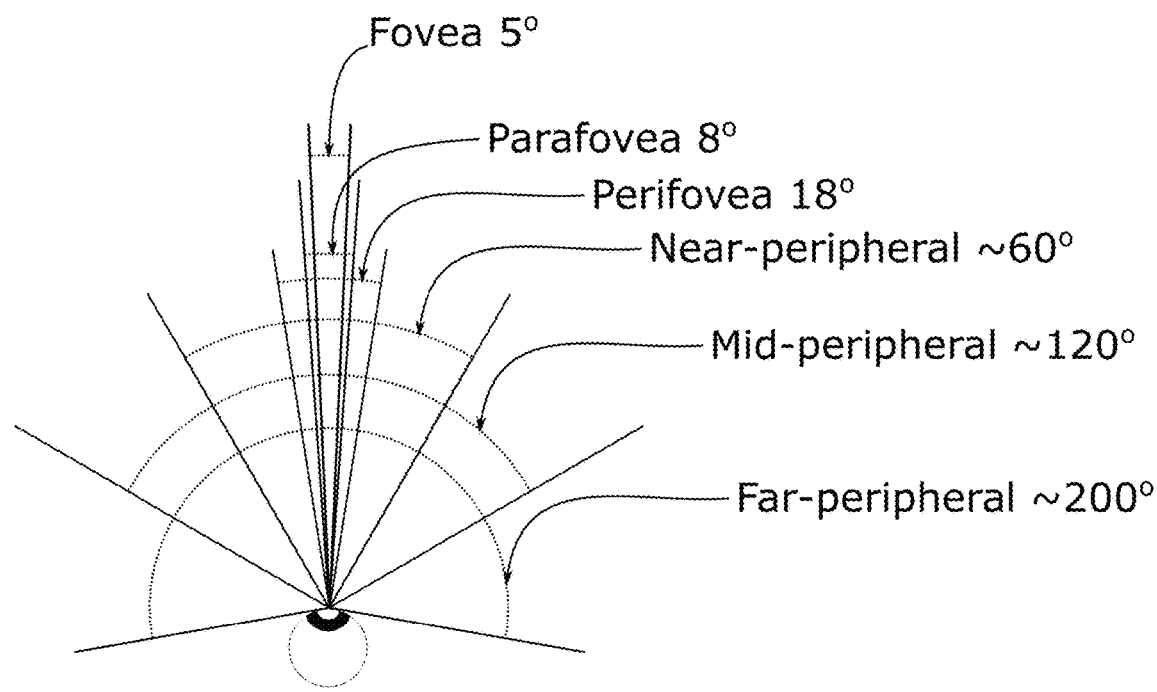
FIG. 1B illustrates the vision ranges of the eye.
Figure 1C:
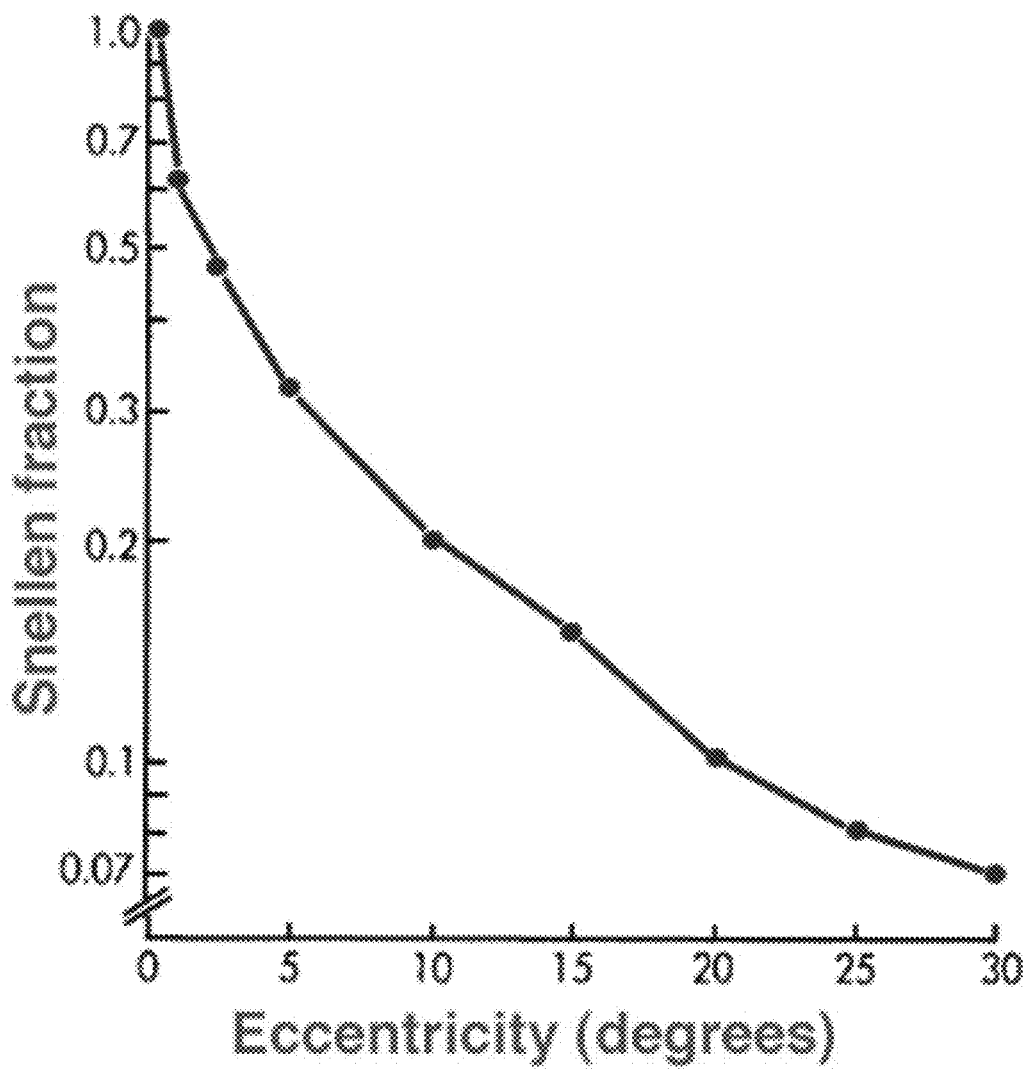
FIG. 1C illustrates the relationship between distance from the fovea center and visual acuity.

The present application discloses a steerable foveal display, referred to as a foveal display. The foveal display in one embodiment is positioned to provide the high resolution area where the user's fovea is located. The "fovea" is small depression in the retina of the eye where visual acuity is highest. FIG. 1A illustrates the eye, showing the retina and the fovea. The center of the field of vision is focused in this region, where retinal cones are particularly concentrated. The center of the fovea is the region of the retina with the highest resolution but has a field of view which is around 2 degrees. The regions of visual acuity, ranging from the highest resolution foveal region to the lowest resolution far peripheral region, are illustrated in FIG. 1B. The resolution of the eye decreases by almost an order of magnitude farther than 20 degrees away from the center of the fovea. FIG. 1C illustrates the drop-off in acuity (Snellen fraction) based on the distance from the center of the fovea (eccentricity).

In one embodiment, the system takes advantage of this by providing a steerable foveal display directed to align with the center of the field of view of the user's eye, or another calculated position. In one embodiment, a field display provides a lower resolution field display image over a larger field of view. This means that the user perceives the images in their peripheral vision, as well as in the direction of their gaze. In one embodiment, the system provides a high resolution image using a foveal display, directed primarily toward the center of the field of view of the user's eye, and a field display image over a large field of view utilizing a second field display. This means that the user perceives the images in their peripheral vision, as well as in the direction of their gaze. In one embodiment, the system uses a high pixel density display per eye to present a high resolution image over a small field of view and a lower-resolution image over a large field to fill in the binocular and peripheral regions. In one embodiment, the resolution of the foveal display is between 0.2 arc-minutes per pixel and 3 arc-minutes per pixel. In one embodiment, the resolution of the field display is between 1 arc-minutes per pixel and 20 arc-minutes per pixel. In one embodiment, the field display and foveal display may be combined in a single variable pixel display. In one embodiment, the system uses a variable pixel density display for each eye to present a high resolution image over a small field of view to the foveal regions of each eye and a lower resolution image over a large field to fill in the binocular and peripheral regions. In one embodiment, the variable pixel density display may be a standard display addressed at a variable density.

Such a system creates the perception of a high resolution image with a wide field of view while requiring only a fraction of the number of pixels or amount of processing of a traditional near-eye display of equally high perceived resolution. In one embodiment, such a system also reduces the power consumption of the rendering system significantly by reducing the number of pixels rendered.

The system may include more than two displays, in one embodiment. In one embodiment, there may be three levels of resolution, covering the foveal area for each eye, the area of binocular overlap, and the peripheral area. In one embodiment, the video images for multiple displays and resolutions may be aggregated together. In another embodiment, the video images for multiple displays and resolutions may be separate.

Figure 1D:
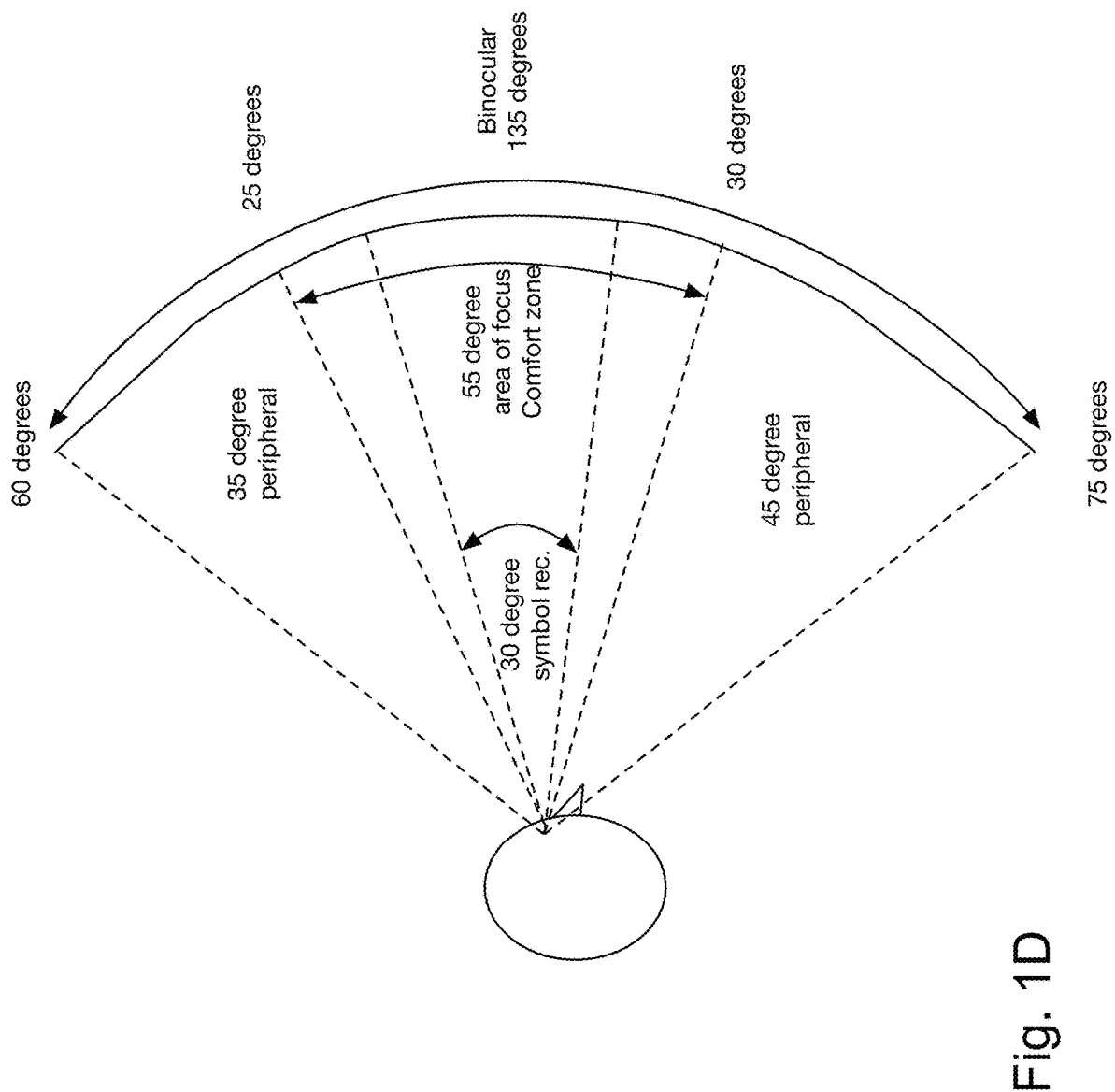
FIG. 1D illustrates an exemplary a vertical field of view.

FIG. 1D illustrates an exemplary vertical field of view, showing the 55-degree area of focus, or comfort zone, as well as the peripheral areas. The symbol recognition area is approximately 30 degrees vertically.

Figure 1E:
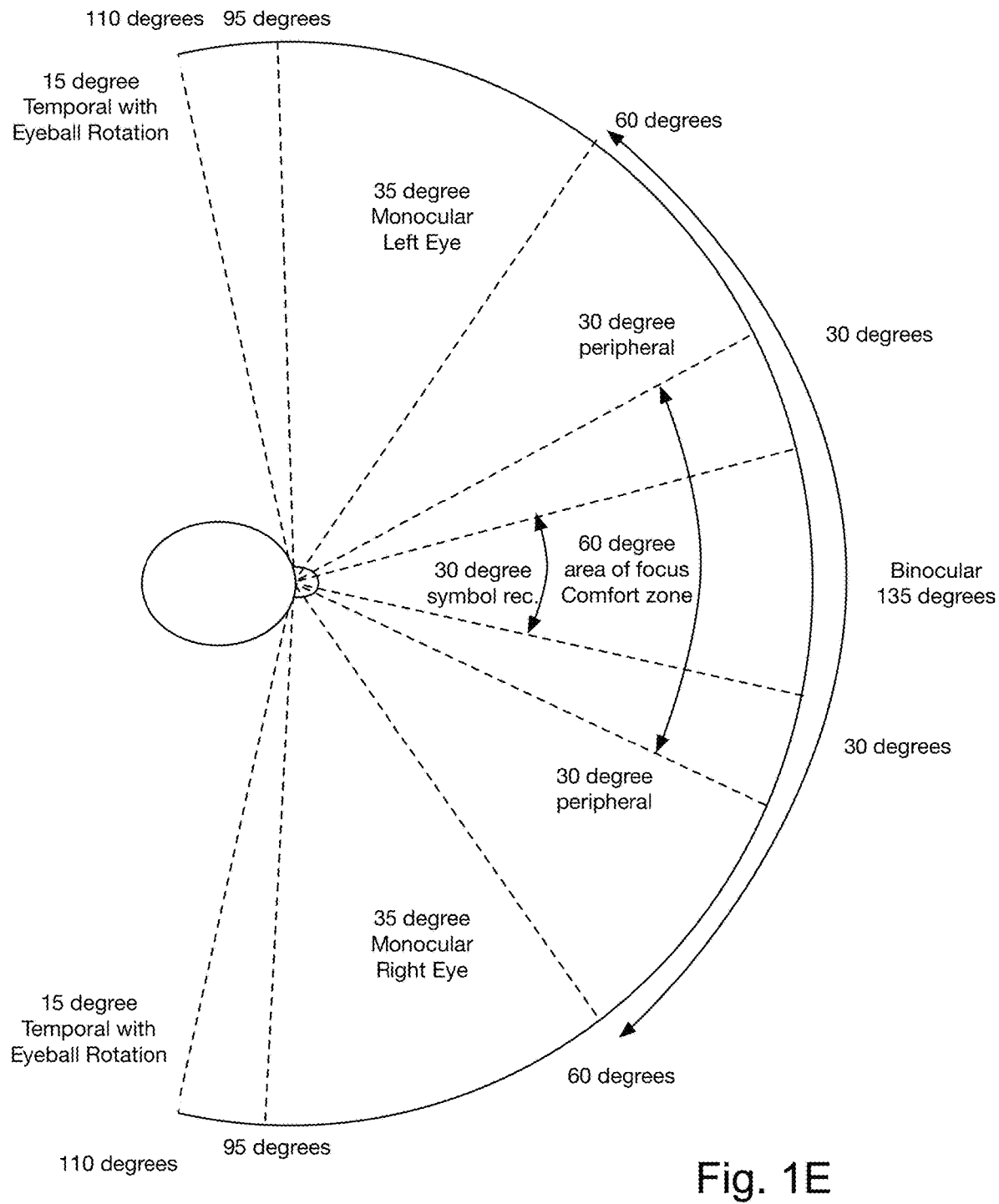
FIG. 1E illustrates an exemplary horizontal field of view.

FIG. 1E illustrates an exemplary horizontal field of view, showing a 60-degree area of focus, and 30-degree symbol recognition zone, as well as the peripheral vision areas, and the full binocular range of 135 degrees. Beyond that, there is a monocular range (for the right and left eyes), and a temporal range which is only visible when the user shifts the eye.

In one embodiment, the steerable foveal display is positioned within the vertical and horizontal 30-degree symbol recognition area. In another embodiment, the steerable foveal display is positioned within the 55-degree vertical and 60-degree horizontal area of focus/comfort zone.

Figure 1G:
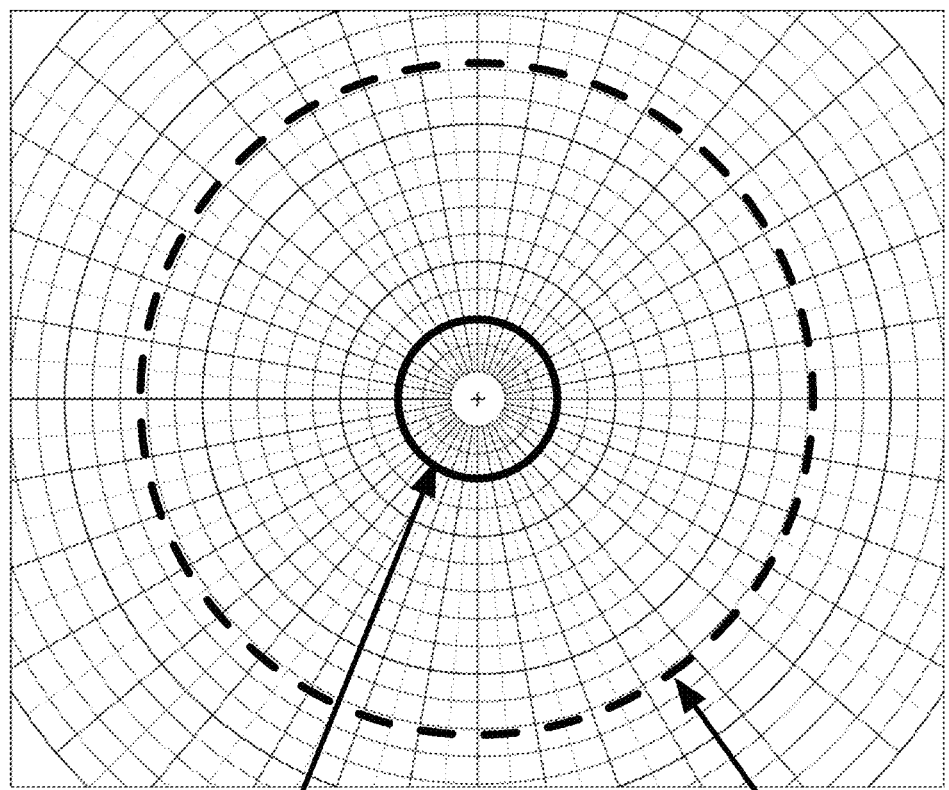
FIG. 1G illustrates the position of the steerable foveal display for the first exemplary gaze vector shown in FIG. 1F.
Figure 1F:
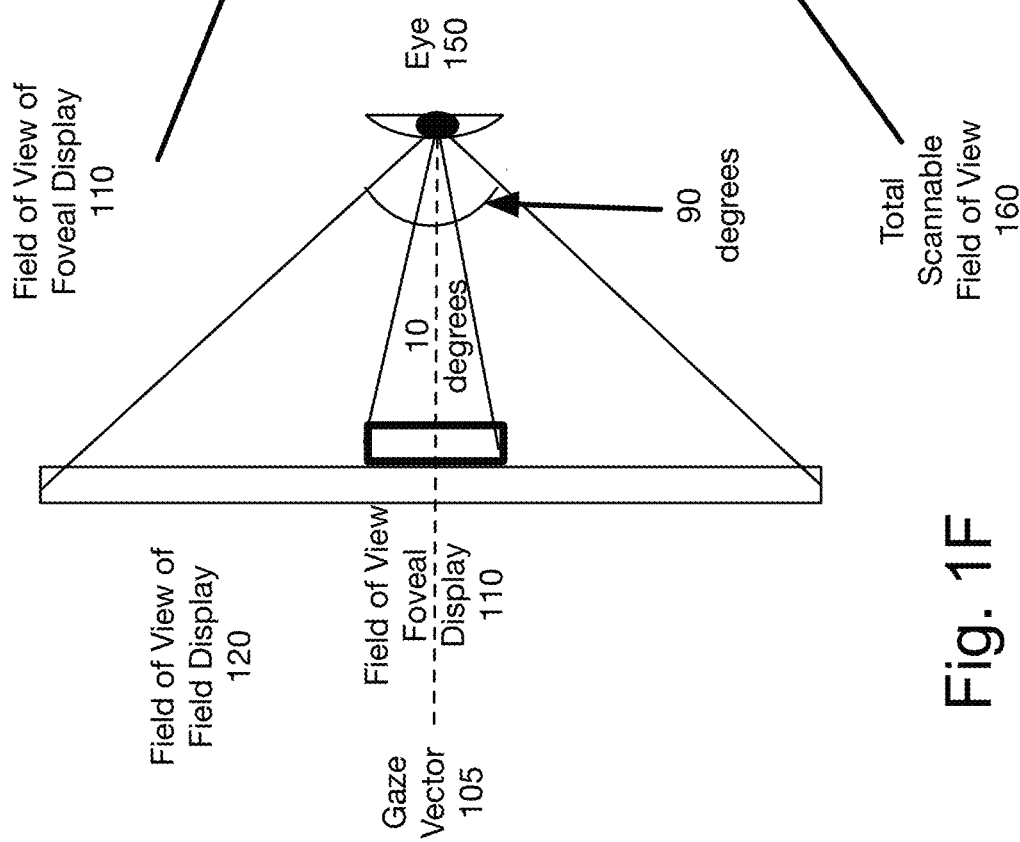
FIG. 1F illustrates an eye with a first exemplary gaze vector.

FIGS. 1F and 1G illustrate the fields of view of the foveal display for one eye. In one embodiment, the foveal display 110 is positioned to be centered around the gaze vector 105. The gaze vector defines the center of the eye's field of view.

In one embodiment, the field of view of the foveal display 110 is a monocular field of view of a minimum field of view spanning 1 degree and a maximum field of view spanning 20 degrees. The field of view of field display 120 in one embodiment provides a monocular field of view spanning 40 degrees, and at most the full monocular range. The full monocular range of the field of view is typically considered to be 60 degrees toward the nose, 107 degrees away from the nose, and 70 degrees above the horizontal, and 80 below the horizontal.

In one embodiment, a field display 120 may provide image data outside the range of the foveal display 110. FIG. 1F provides a top view, showing the eye, and the field of view of a foveal display 110 centered around the gaze vector 105. FIG. 1G provides a front view, showing the exemplary position of the field of view of the foveal display 110. In one embodiment, a foveal display 110 has a total scannable field of view 160 between 20 and 160 degrees, within which it can be positioned. As noted above, the foveal display 110 has a monocular field of view of at least 1 degree. In one embodiment, the foveal display foveal 110 has a monocular field of view of 10 degrees, and the total scannable field of view 160 for the foveal display is 60 degrees. This enables the positioning of the foveal display 110 at the correct location.

Figure 1I:
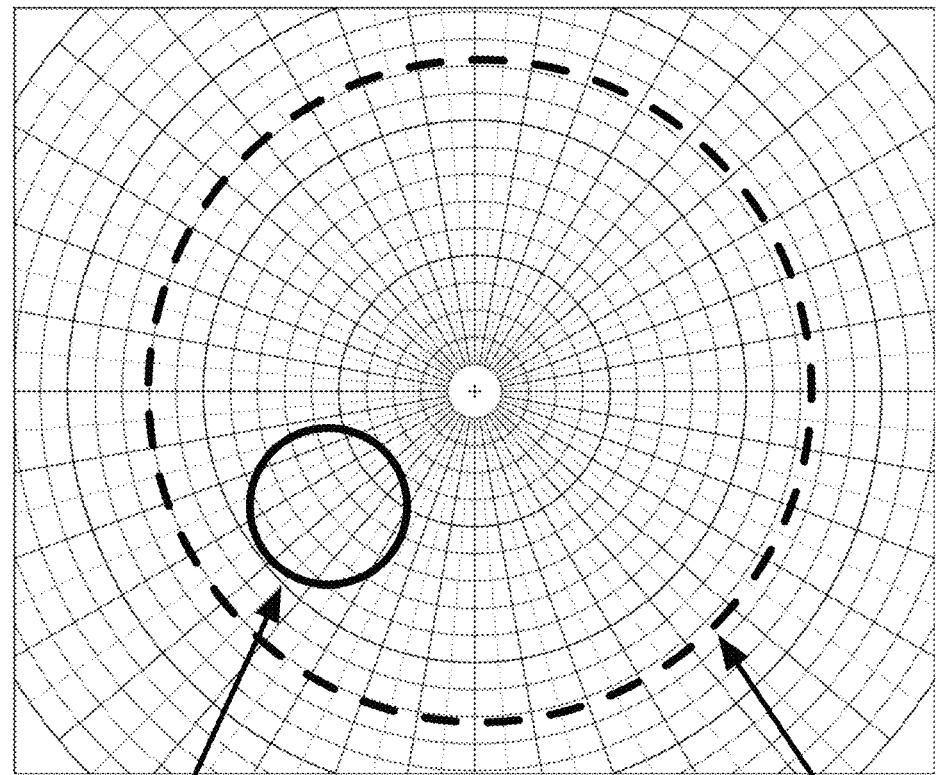
FIG. 1I illustrates the position of the steerable foveal display for the second exemplary gaze vector shown in FIG. 1H.
Figure 1H:
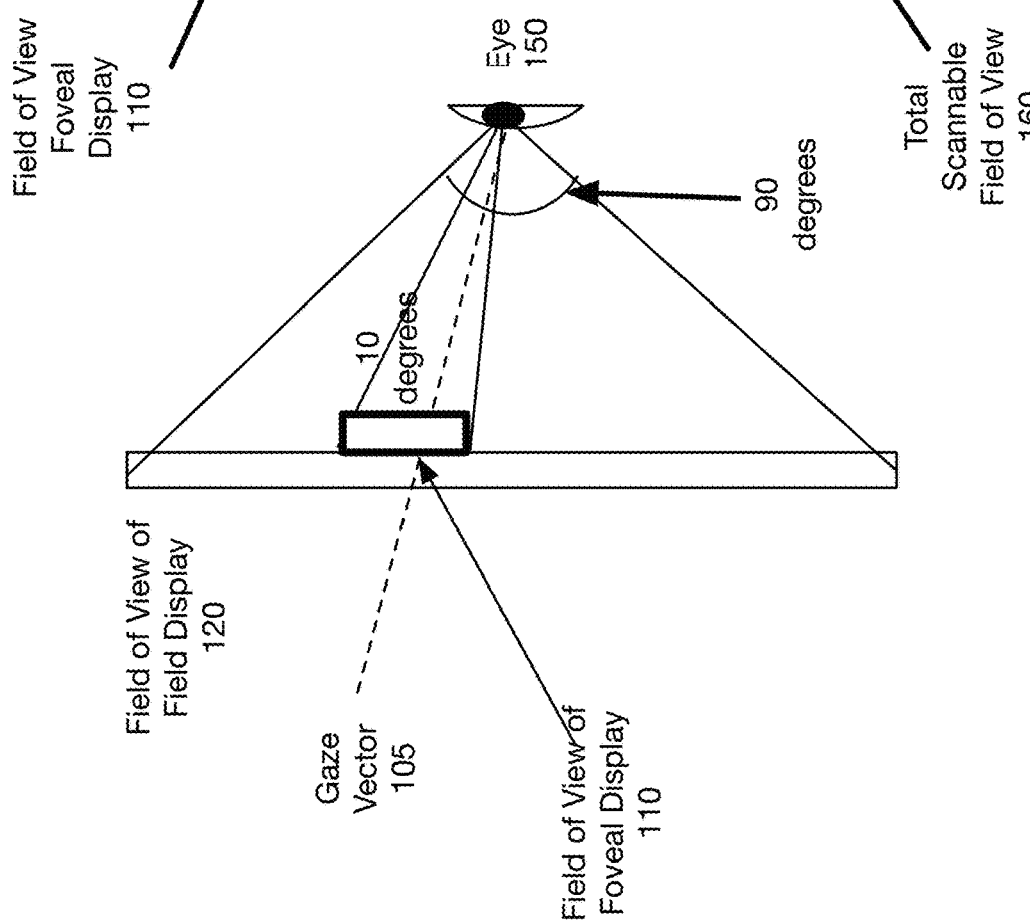
FIG. 1H illustrates an eye with a second exemplary gaze vector.

FIGS. 1H and 1I show the field of view of the foveal display 110 positioned in a different location, as the user is looking up and to the left. As can be seen in this configuration, the field of view of the foveal display 110 is moved, and the portion of the field of view of the field display above and below the field of view of the foveal display 110 is not even. FIG. 1I shows an exemplary positioning of the field of view of the display from the front.

Using a system including a foveal display in combination with a field display creates the perception of a high resolution image with a wide field of view while requiring only a fraction of the number of pixels and amount of processing of a traditional near-eye display. In one embodiment, such a system also reduces the power consumption of the rendering system significantly by reducing the number of pixels rendered.

The system may include more than two displays per eye, in one embodiment. In one embodiment, there may be three levels of resolution, covering the foveal area for each eye, the area of binocular overlap, and the peripheral area. In another embodiment, the system includes only the steerable foveal display, and the field display may be provided by an external system. In another embodiment, the system may consist only of the steerable foveal display with no associated field display.

Figure 1J:
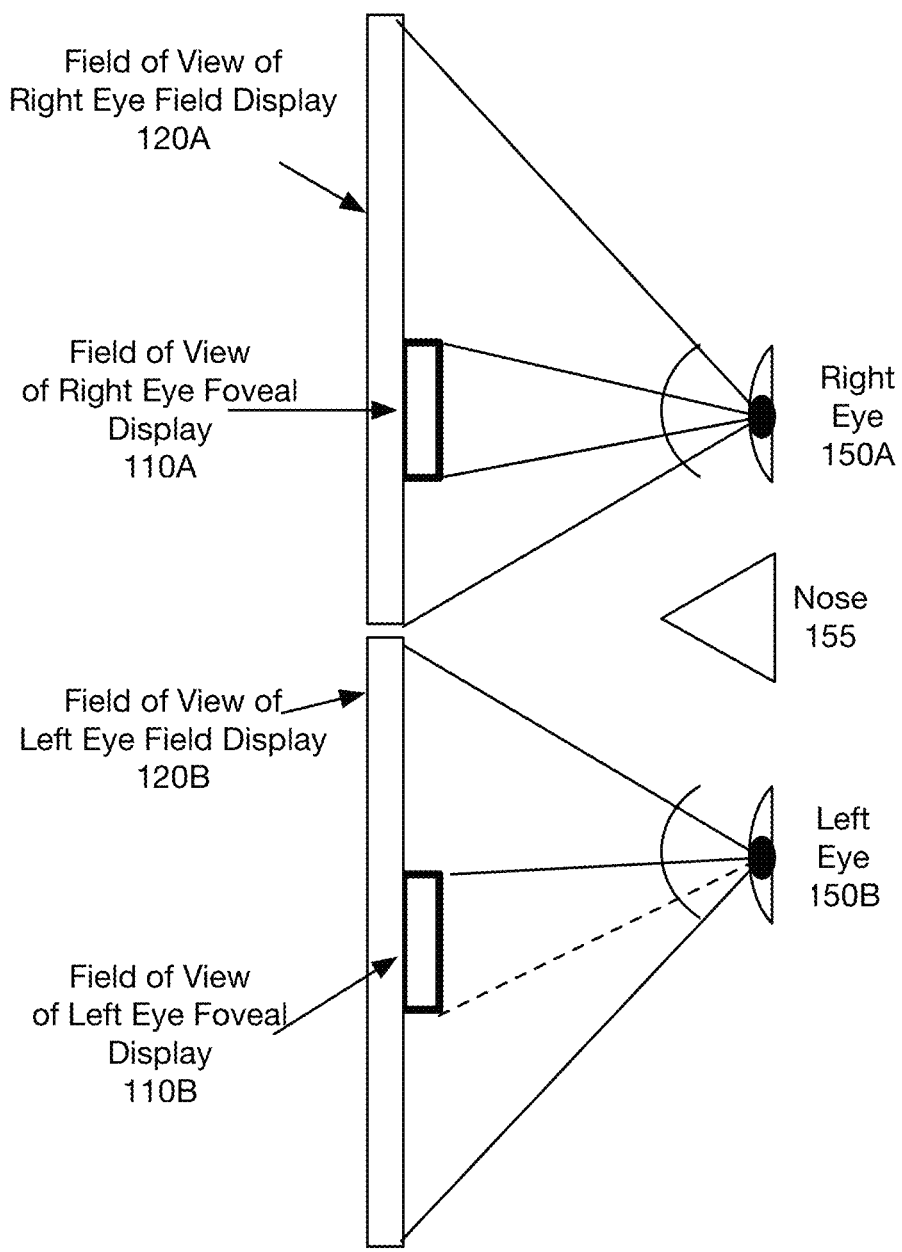
FIG. 1J illustrates one embodiment of the binocular display showing foveal displays and field displays for each eye.

FIG. 1J illustrates one embodiment of the binocular display including the field of view of the right eye foveal display 110A, and the field of view for the left eye foveal display 110B. For each of the right eye 150A and left eye 150B, there is also a field display with a larger field of view, 120A and 120B respectively. The field display field of view 120A, 120B, in one embodiment extends through at least the area of focus.

Figure 1K:
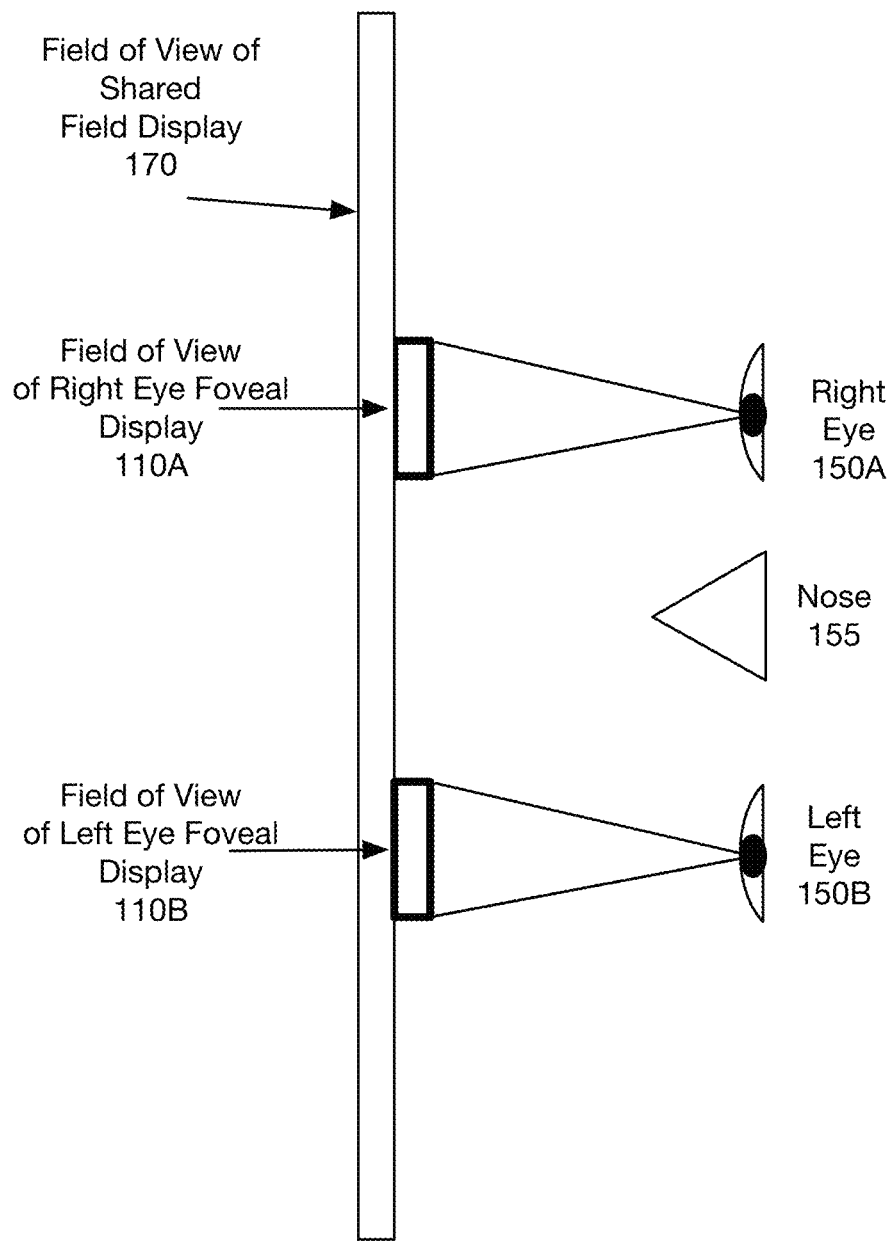
FIG. 1K illustrates one embodiment of the binocular display showing foveal displays for each eye and a shared field display.

FIG. 1K illustrates one embodiment of the binocular display including the field of view of the right eye foveal display 110A and the field of view for the left eye foveal display 110B. In this configuration, however, the field display 170 is a single display that extends across the user's field of view. In one embodiment, the foveal display and the field display may be a display integrated into wearable display, such as goggles. In another embodiment, the foveal display may be part of a wearable device, while the field display is a separate display such as a projector or screen.

Figure 2:
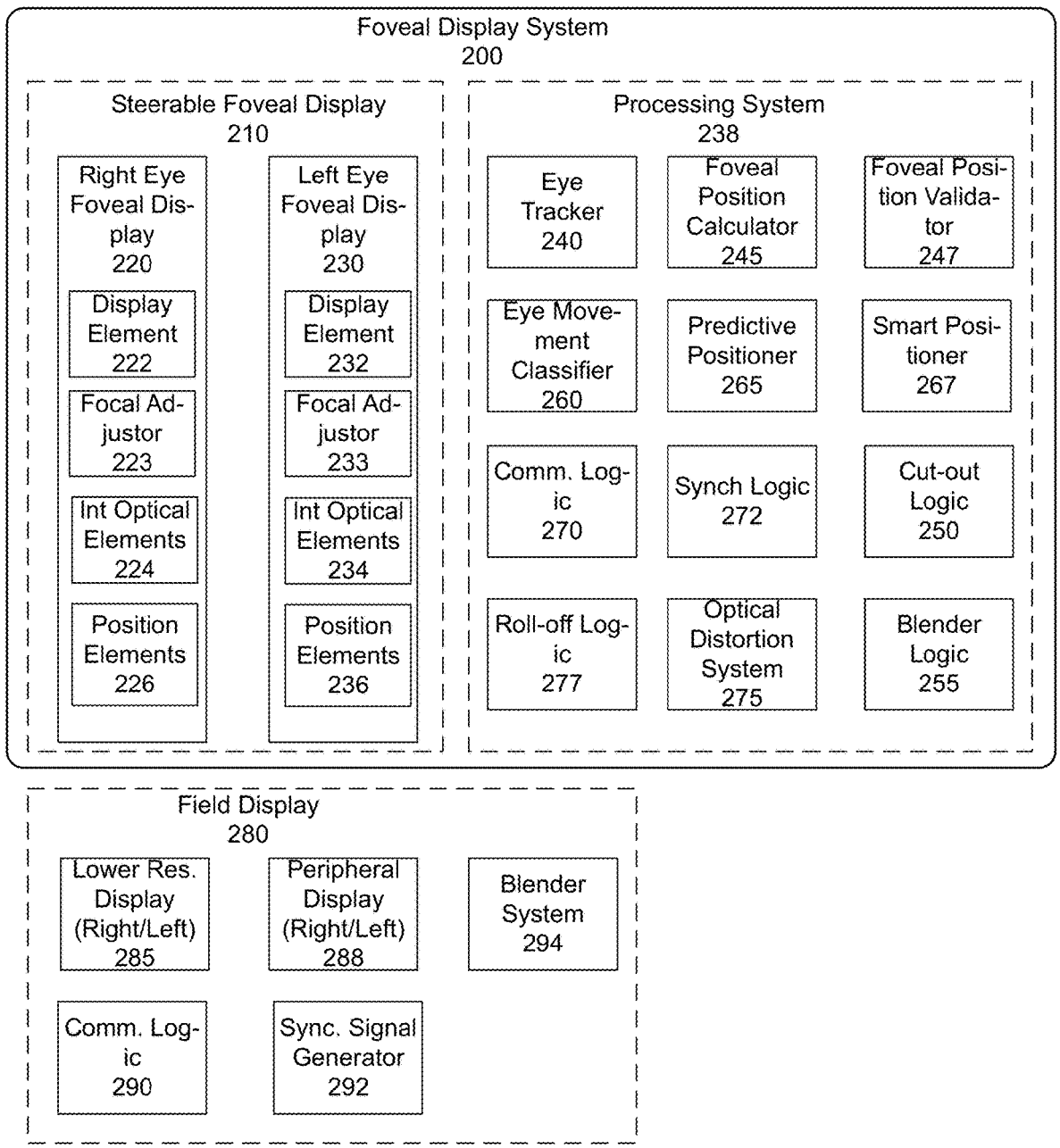
FIG. 2 is a block diagram of one embodiment of the system.

FIG. 2 illustrates one embodiment of the exemplary optical system 210, 280 and associated processing system 238. In one embodiment, the processing system may be implemented in a computer system including a processor. In one embodiment, the processing system 238 may be part of the display system. In another embodiment, the processing system 238 may be remote. In one embodiment, the optical system 210, 280 may be implemented in a wearable system, such as a head mounted display. The foveal image is presented to the user's eye through a right eye foveal display 220 and left eye foveal display 230, which direct the foveal display. In one embodiment, the foveal displays 220, 230 direct the foveal display image primarily toward the center of the field of view of the user's eye. In another embodiment, the image may be directed to a different location, as will be described below.

The foveal image for the right eye is created using a first display element 222. In one embodiment, the display element is a digital micromirror device (DMD). In one embodiment, the display element 222 is a scanning micromirror device. In one embodiment, the display element 222 is a scanning fiber device. In one embodiment, the display element is an organic light-emitting diode (OLED). In one embodiment, the display element 222 is a liquid crystal on silicon (LCOS) panel. In one embodiment, the display element 222 is a liquid crystal display (LCD) panel. In one embodiment, the display element 222 is a micro-LED or micro light emitting diode (µLED) panel. In one embodiment, the display element is a scanned laser system. In one embodiment, the system is a hybrid system with an off axis holographic optical element (HOE). In one embodiment, the system includes a waveguide. In one embodiment, the waveguide is a multilayer waveguide. In one embodiment, the display element may include a combination of such elements. FIGS. 5-16 below discuss the display elements in more detail.

In one embodiment, the first display element 222 is located in a near-eye device such as glasses or goggles.

The focus and field of view for the foveal display is set using intermediate optical elements 224. The intermediate optical elements 224 may include but are not limited to, lenses, mirrors, and diffractive optical elements. In one embodiment, the focus of the virtual image is set to infinity. In another embodiment, the focus of the virtual image is set closer than infinity. In one embodiment, the focus of the virtual image can be changed. In one embodiment, the virtual image can have two or more focal distances perceived simultaneously.

In one embodiment, the foveal display image is directed primarily toward the center of the field of view of the user's eye. In one embodiment, the field of view (FOV) of the foveal display image is greater than 1 degree. In one embodiment, the FOV of the foveal display image is between 1 degree and 20 degrees. In one embodiment, the foveal display image may be larger than 5 degrees to address inaccuracies in eye tracking, provide the region needed to successfully blend such that the user cannot perceive the blending, and account for the time it takes to reposition the foveal display for the various types of eye movements.

In one embodiment, the system further includes a lower resolution field display image, which has a field of view of 20-220 degrees.

In one embodiment, the foveal display image is projected directly onto the user's eye using a set of one or more totally or partially transparent positioning elements 226. In one embodiment, the positioning elements 226 include a steerable mirror. In one embodiment, the positioning elements 226 include a curved mirror. In one embodiment, the positioning elements 226 include a Fresnel reflector. In one embodiment, the positioning elements 226 include a diffractive element. In one embodiment, the diffractive element is a surface relief grating. In one embodiment, the diffractive element is a volume hologram. In one embodiment, the display 220 may include a focal adjustor 223, which enables the display to show image elements at a plurality of focal distances in the same frame. In one embodiment, the focal adjustor 223 may be an optical path length extender, as described in U.S. patent application Ser. No. 15/236,101 filed on Aug. 12, 2016.

A similar set of elements are present for the left eye foveal display 230. In one embodiment, the right eye foveal display 220 and the left eye foveal display 230 are matched. In another embodiment, they may include different elements.

In one embodiment, an eye tracker 240 tracks the gaze vector of the user, e.g. where the eye is looking. In one embodiment, the eye tracking system is a camera-based eye tracking system 240. In one embodiment, eye tracking system 240 is an infrared scanning laser with a receiving sensor. Other eye tracking mechanisms may be used. Foveal position calculator 245 determines a center of the user's field of view based on data from the eye tracking system 240.

In one embodiment, the adjustable positioning elements 226, 236 are used to adjust the foveal display 220, 230 to position the foveal image to be directed primarily toward the center of the field of view of the user's eye. In one embodiment, the direction of the image is adjusted by changing the angle of a mirror, one of the position elements 226, 236. In one embodiment, the angle of the mirror is changed by using electromagnetic forces. In one embodiment, the angle of the mirror is changed by using electrostatic forces. In one embodiment, the angle of the mirror is changed by using piezoelectric forces. In one embodiment, the adjustable element is the image source, or display element 222, 232 which is moved to position the image. In one embodiment, the foveal image is positioned to be directed to the center of the field of view of the user's eye. In another embodiment, another position element 226, 236 may be changed, such as a steering element 226, 236.

A field display 280 communicates with the processing system 238 via communication logics 270, 290. In one embodiment, there may be multiple displays. Here, two field displays are indicated, field display 285 and peripheral display 288. Additional levels of resolution may also be shown. In one embodiment, the field display 280 may include a single field display 285 viewed by both eyes of the user, or one field display per eye. In one embodiment, the field display 280 may have variable resolution.

In one embodiment, when the field display 280 is a separate system, sync signal generator 292 is used to synchronize the display of the independent foveal display 210 with the display of the field display 280. In one embodiment, the sync signal generator 292 is used to synchronize the adjustable mirror, or other positioning element of the foveal display with the field display. This results in the synchronization of the displays. In one embodiment, field display 280 includes blender system 294 to blend the edges of the foveal display image with the field display image to ensure that the transition is smooth.

In one embodiment, the lower resolution field display image is presented to the user with a fully or partially transparent optical system. In one embodiment, this partially transparent system includes a waveguide optical system. In one embodiment, this partially transparent system includes a partial mirror which may be flat or have optical power. In one embodiment, this partially transparent system includes a diffractive optical element. In one embodiment, this image is presented to the user through a direct view optical system. In one embodiment, this partially transparent system includes inclusions to reflect or scatter light.

In one embodiment of the field display 280, an additional display sub-system is used to display images in the region of monovision peripheral view 288. In one embodiment, this sub-system is an LED array. In one embodiment, this sub-system is an OLED array. In one embodiment, this display sub-system uses a scanned laser. In one embodiment, this sub-system uses an LCD panel. In one embodiment, this sub-system has no intermediate optical elements to manipulate the FOV or focus of the image. In one embodiment, this sub-system has intermediate optical elements. In one embodiment, these intermediate optical elements include a micro-lens array.

The image data displayed by the steerable foveal display 210 and field display 280 are generated by processing system 238. In one embodiment, the system includes an eye tracker 240. In one embodiment, an eye tracker 240 tracks the gaze vector of the user, e.g. where the eye is looking. In one embodiment, the eye tracking system is a camera-based eye tracking system 240. Alternately, eye tracking system 240 may be infrared laser based. Foveal position calculator 245 determines a center of the user's field of view based on data from the eye tracking system 240.

The processing system 238 in one embodiment further includes foveal position validator 247 which validates the positioning of the position elements 226, 236, to ensure that the displays 220, 230 are properly positioned. In one embodiment, this includes re-evaluating the foveal display location with respect to the center of the field of view of the user's eye, in light of the movement of the foveal display. In one embodiment, the foveal position validator 247 provides feedback to verify that the positioning element has reached its target location, using a sensing mechanism. The sensing mechanism may be a camera, in one embodiment. The sensing mechanism may be gearing in one embodiment. The sensing mechanism may be another type of sensor that can determine the position of an optical element. In one embodiment, if the actual position of the foveal display is not the target position, the foveal position validator 247 may alter the display to provide the correct image data. This is described in more detail below.

In one embodiment, eye movement classifier 260 can be used to predict where the user's gaze vector will move. This data may be used by predictive positioner 265 to move the foveal display 220, 230 based on the next position of the user's gaze vector. In one embodiment, smart positioner 267 may utilize user data such as eye movement classification and eye tracking to predictively position the displays 220, 230. In one embodiment, smart positioner 267 may additionally use data about upcoming data in the frames to be displayed to identify an optimal positioning for the displays 220, 230. In one embodiment, smart positioner 267 may position the display 220, 230 at a position not indicated by the gaze vector. For example, if the displayed frame data has only a small amount of relevant data (e.g. a butterfly illuminated on an otherwise dark screen) or the intention of the frame is to cause the viewer to look in a particular position.

The processing system 238 may further include a cut-out logic 250. Cut-out logic 250 defines the location of the foveal display 220, 230 and provides the display information with the cut-out to the associated field display 280. The field display 280 renders this data to generate the lower resolution field display image including the cut out the corresponding portion of the image in the field display. This ensures that there isn't interference between the foveal image and field image. In one embodiment, when there is a cut-out, blender logic 255 blends the edges of the cutout with the foveal image to ensure that the transition is smooth. In another embodiment, the foveal display may be used to display a sprite, a brighter element overlaid over the lower resolution field image. In such a case, neither the cut out logic 250 nor blender logic 255 is necessary. In one embodiment, the cut out logic 250 and blender logic 255 may be selectively activated as needed.

In one embodiment, the system may synchronize the foveal display 210 with an independent field display 280. In this case, in one embodiment, synchronization logic 272 synchronizes the displays. In one embodiment, the independent field display 280 is synchronized with the adjustable mirror, or other positioning element of the foveal display 210. This results in the synchronization of the displays. The field display 280 may receive positioning data. In one embodiment, there may not be a cutout in this case.

In one embodiment, the processing system 238 may include an optical distortion system 275 for the foveal display 210 with distortion that increases from the center to the edge of the image. This intentional distortion would cause the pixels to increase in perceived size moving from the center of the foveal image to the edge. This change in perceived resolution would reduce the amount of processing required, as fewer pixels would be needed to cover the same angular area of the foveal display image.

Figure 5A:
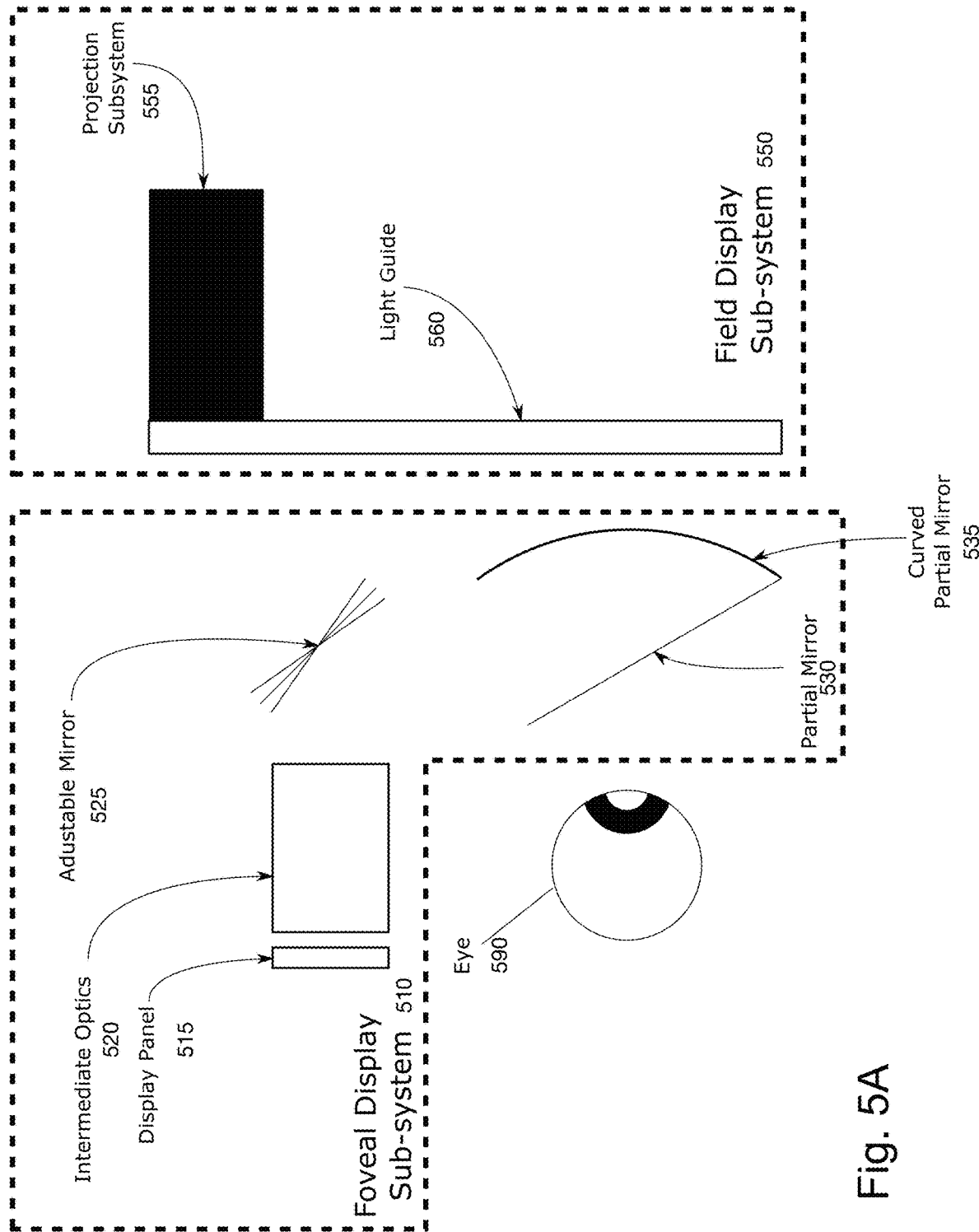
FIG. 5A is an illustration of one embodiment of a hybrid display.
Figure 5B:
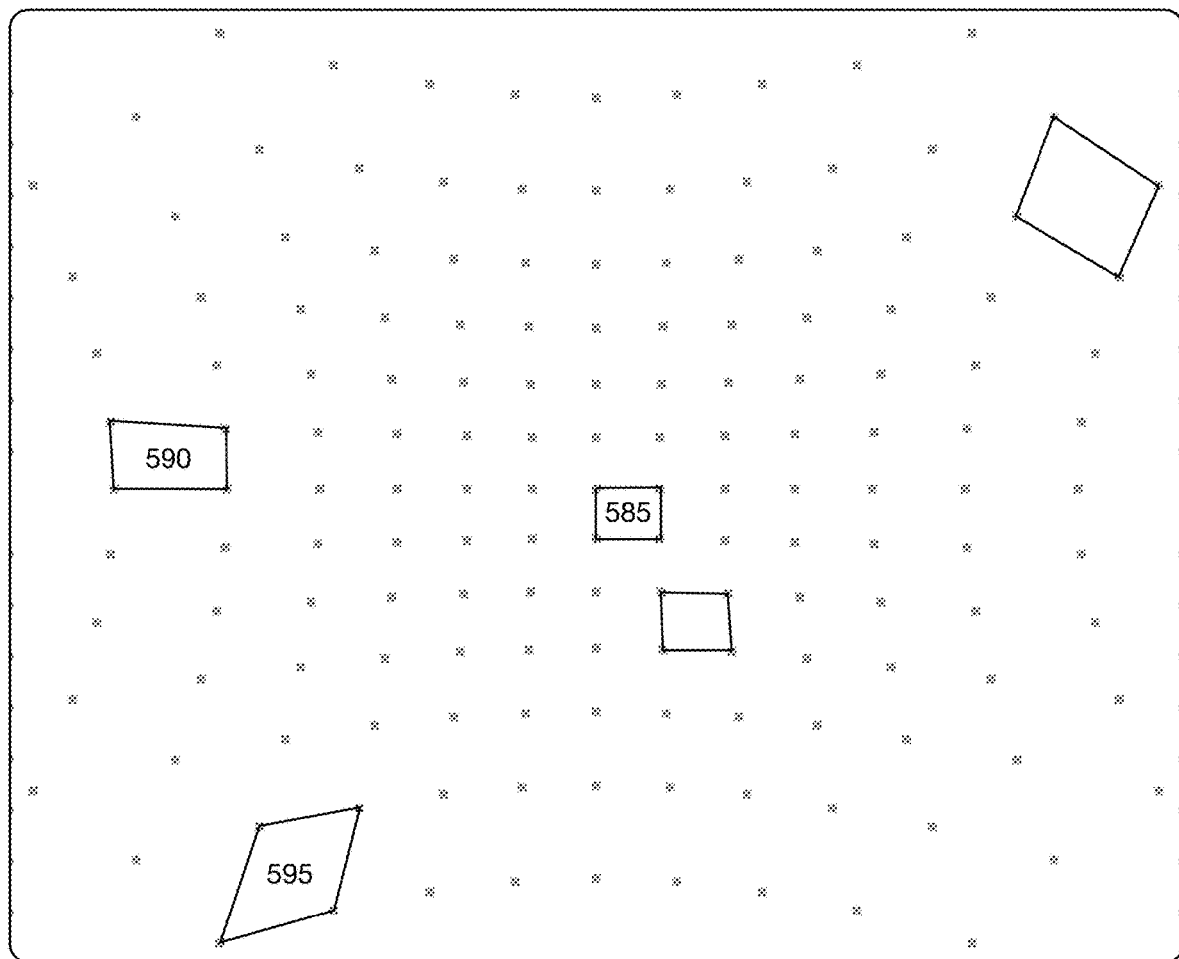
FIG. 5B is an illustration of one embodiment of a display using roll-off magnification.

FIG. 5B shows an example of a distorted image with lower resolution as the angle from the optical axis increases. The optical distortion may help with the blending between the foveal display 210 and the field display 280. In another embodiment, the foveal display 210 including the optical distortion system 275 could be used without a field display. It also provides for an easier optical design, and saves processing on the blending.

In one embodiment, the variable resolution highly distorted image has a large ratio between center and edge. The total FOV of this display would be large (up to 180 degrees).

In one embodiment, roll-off logic 277 provides a roll-off at the edges of the display. Roll-off in one embodiment may include resolution roll-off (decreasing resolution toward the edges of the display area). In one embodiment, this may be implemented with magnification by the optical distortion system 275. Roll-off includes in one embodiment brightness and/or contrast roll off (decreasing brightness and/or contrast toward the edges.) Such roll-off is designed to reduce the abruptness of the edge of the display. In one embodiment, the roll-off may be designed to roll off into "nothing," that is gradually decreased from the full brightness/contrast to gray or black or environmental colors. In one embodiment, roll-off logic 277 may be used by the foveal display 210 when there is no associated field display. In one embodiment, the roll-off logic 297 may be part of the field display 280, when there is a field display in the system.

Figure 3:
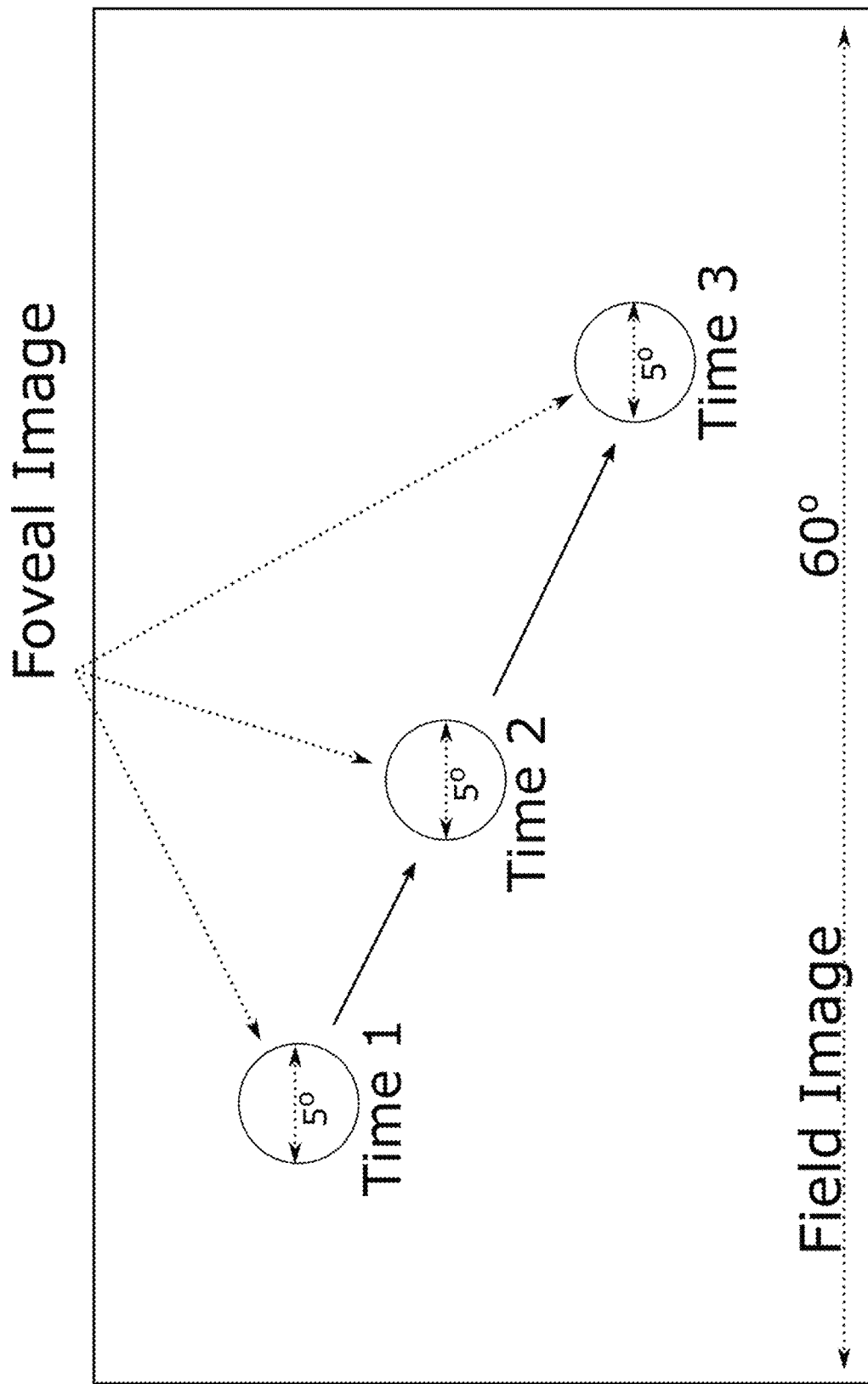
FIG. 3 is an illustration of one embodiment of the movement of the high resolution area, over time, in a moveable foveal display.

FIG. 3 illustrates one embodiment of the movement of the foveal image over time, as the user's eye moves. In any time instance, there is a small zone, to which the foveal image is displayed. The location of the 5 degree display of high resolution (in this example) is focused on the center of the user's field of view. The low resolution field image provides a large field of view. But because the relative resolution of the eye outside the foveal area is lower, the user perceives this combination image, including the small high resolution foveal image and the larger low resolution field image as high resolution across the large field of view.

Figure 4A:
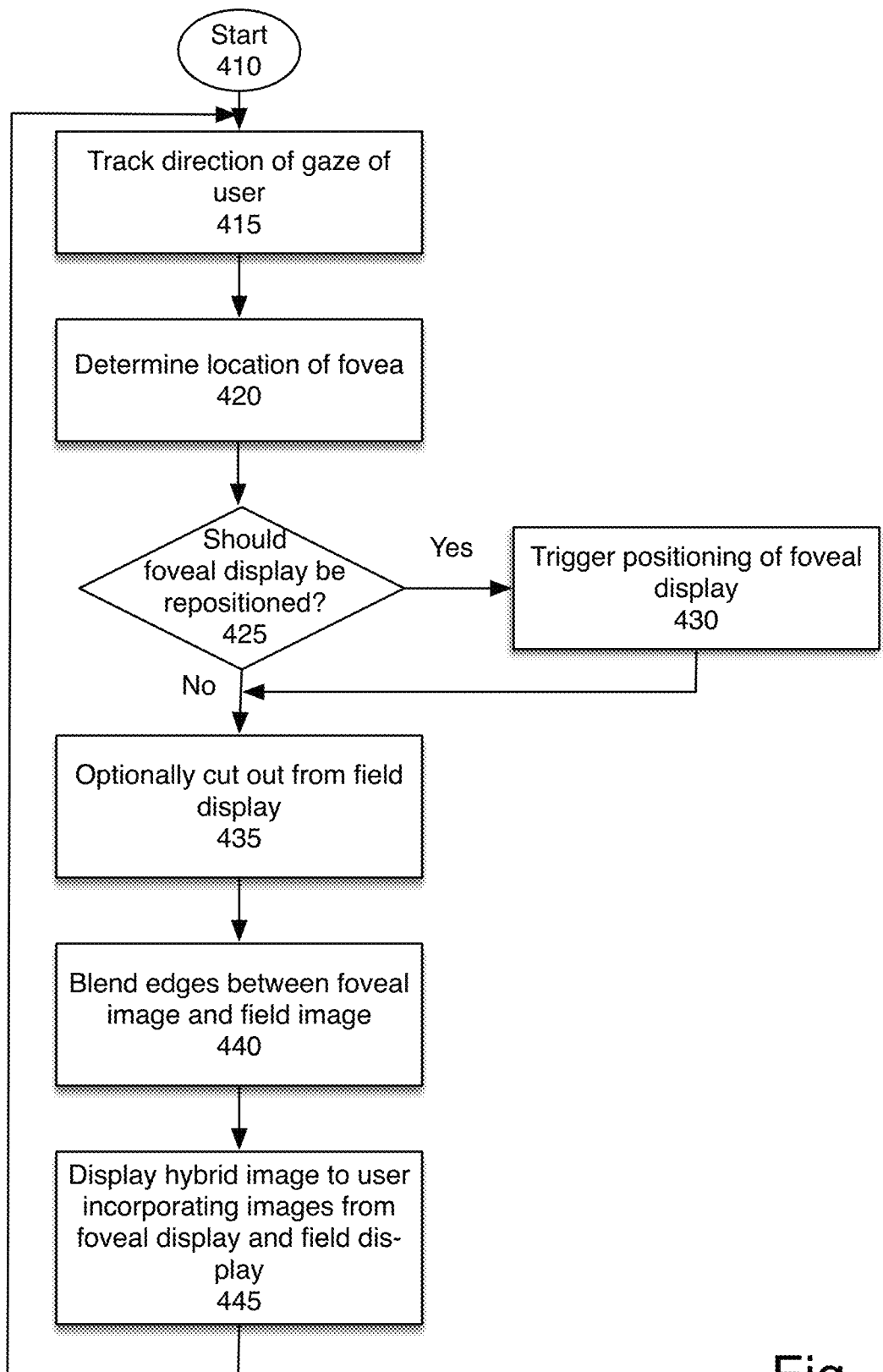
FIGS. 4A and 4B are a flowchart of one embodiment of utilizing the display.

FIG. 4A is a flowchart of one embodiment of utilizing the foveal display. The process starts at block 410. In one embodiment, prior to the start of this process the display system is fitted to the user. This initial set-up includes determining the interpupillary distance (IPD) and any prescription needed, to ensure that the "baseline" display for the user is accurate.

At block 415, the user's eyes are tracked. In one embodiment, an IR camera is used for tracking eyes. In one embodiment, eye tracking identifies the gaze vector of the user, e.g. where the user is focused. The eye tracking may identify left and right eye gaze vector/angle, and gaze center (derived from the L/R eye gaze vectors). The eye tracking may determine the location (X, Y, Z) and orientation (roll, pitch, yaw) of the left and right eyes relative to a baseline reference frame. The baseline reference frame is, in one embodiment, established when the display is initially fitted to the user and the user's interpupillary distance, diopters, and other relevant data are established.

At block 420, the location of the fovea is determined based on the gaze vector data. In one embodiment, the fovea location includes coordinates (X, Y, Z) and orientation (roll, pitch, yaw) for each eye.

At block 425, the process determines whether the foveal display should be repositioned. This is based on comparing the current position of the foveal display with the user's gaze vector or the intended position of the foveal image. If they are misaligned, the system determines that the foveal display should be repositioned. If so, at block 430, the display is repositioned. In one embodiment, if the foveal display is moved more than a particular distance, the display is turned off during the move. This ensures that the user does not perceive the movement. In one embodiment, the particular distance is more than 0.5 degrees. In one embodiment, the foveal display is not turned off if the movement is occurring while the user is blinking. Note that although the term "repositioning" is used, this does not generally mean that there is a physical movement of the eye pieces. In one embodiment, a mirror or other optical elements which position the display are used to alter the center positioning of the foveal image. The process then continues to block 435, whether or not the display was repositioned.

At block 435, optionally the system cuts out the portion of the field display that would be positioned in the same location as the foveal display. This prevents the field display from interfering with the foveal display. The cut-out, in one embodiment, is performed at the rendering engine. In another embodiment, the foveal image may be a sprite or other bright image element which does not need a cut-out to be clear. In that instance, this block may be skipped. In one embodiment, the cut-out is skipped if the user eye tracking indicates that the user's gaze has moved substantially from the baseline reference. The baseline reference is the user's default gaze position, from which the movement of the gaze is tracked. A substantial movement from the baseline reference means that the system cannot determine the user's correct gaze position. In this instance, in one embodiment, the foveal image may be dropped, or the foveal display may be turned off momentarily.

At block 440, in one embodiment, the edges between the foveal image and the field image are blended. This ensures a smooth and imperceptible transition between the field image and the foveal image. At block 445, the hybrid image is displayed to the user, incorporating the foveal display and the field display. The process then returns to block 410 to continue tracking and displaying. Note that while the description talks about a foveal image and a field image, the images contemplated include the sequential images of video.

Figure 4B:
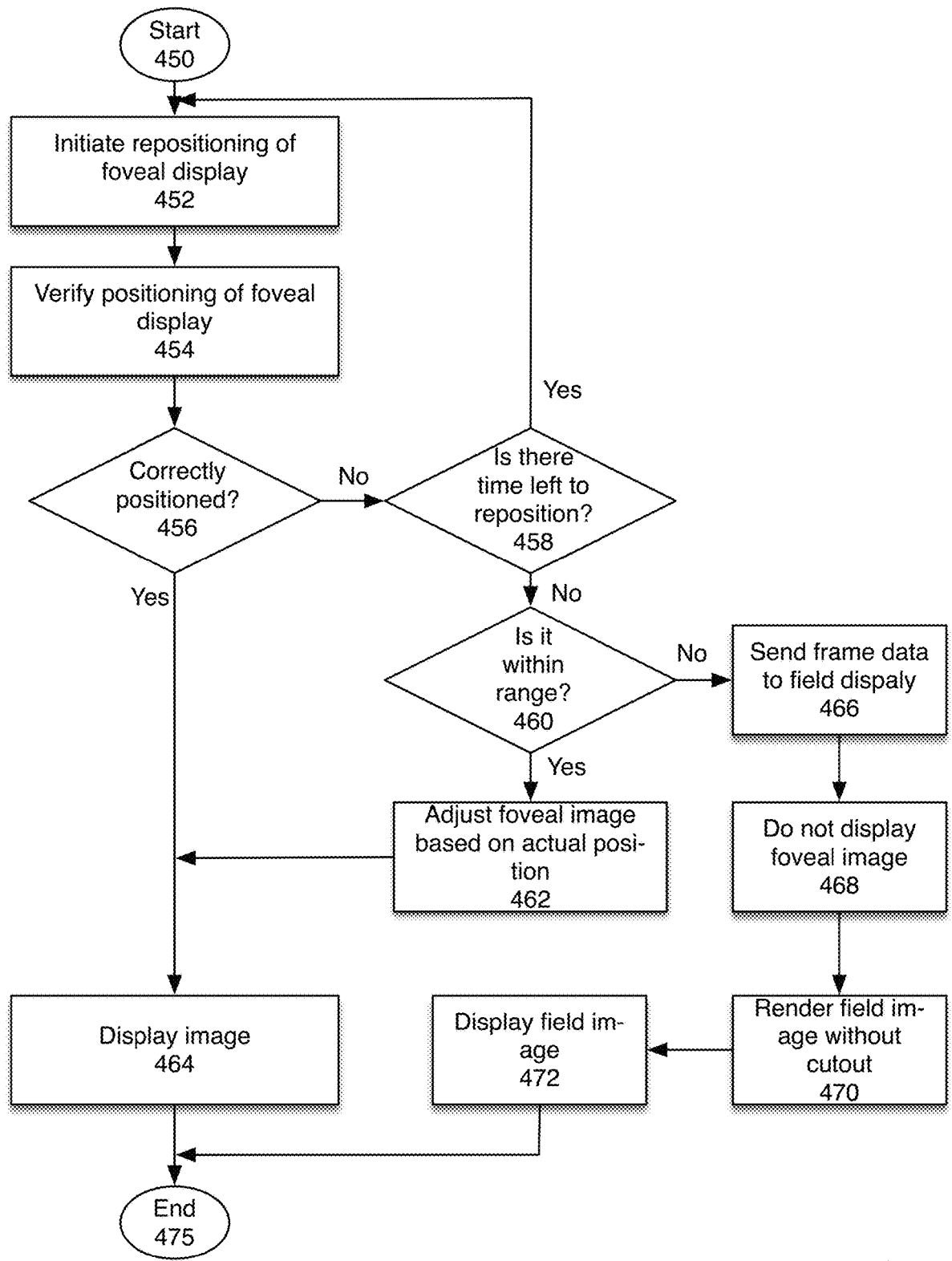

FIG. 4B illustrates one embodiment of the corrective actions which may be taken when the display position validation indicates that the actual location of the foveal display does not match the intended location. The process starts at block 450.

At block 452, the foveal display positioning is initiated. In one embodiment, this corresponds to block 430 of FIG. 4A. Returning to FIG. 4B, at block 454, the actual position of the foveal display is verified. In one embodiment, one or more sensors are used to determine the location and orientation of the foveal display. In one embodiment, the sensors may include cameras, mechanical elements detecting the position of the adjustable mirror or other positioning element, etc.

At block 456 the process determines whether the foveal display is correctly positioned. Correct positioning has the foveal display in the calculated location, to display the foveal image in the appropriate location for the user. If the foveal display is correctly positioned, at block 464 the image is displayed. In one embodiment, this includes displaying a hybrid image including the foveal image in the calculated location and the associated field display image. The process then ends at block 475.

If, at block 456, the process determines that the foveal display was not correctly positioned, the process continues to block 458.

At block 458, the process determines whether there is enough time for the foveal display to be repositioned. This determination is based on a distance that needs to be moved, the speed of movement, and time until the next image will be sent by the processing system. In one embodiment, it also depends on the eye movement of the user. In one embodiment, the system preferentially moves the foveal display while the user is blinking, when no image is perceived. In one embodiment, the repositioning occurs within a blanking period of the display. For example, a movement of just one degree along one coordinate takes less time than moving the foveal display significantly and in three dimensions. If there is enough time, the process returns to block 452 to reposition the foveal display. Otherwise, the process continues to block 460.

At block 460, the process determines whether the actual position of the foveal display is within range of the intended position. In one embodiment, "within range" in this context means that the system is capable of adjusting the display for the difference. If it is within range, the process continues to block 462.

At block 462, the foveal image is adjusted for rendering in the actual position, and the image is displayed at block 464. For example, in one embodiment, the original calculated foveal image may be rendered in the wrong location if the position difference is very small, without causing visual artifacts. In another embodiment, the foveal image may be adjusted to render appropriately at the actual location. For example, the foveal image may be cropped, brightened, distorted, contrast adjusted, chromatic coordinate (white point) adjusted, cropped, and laterally shifted to account for the location difference. In one embodiment, the radial location of the edge blending may be shifted or changed. In one embodiment, the system may over-render, e.g. render 5.5 degrees of visual image for a 5-degree foveal display, enabling a shift of 0.5 degrees without needing re-rendering.

If the foveal display is not within range, at block 466, in one embodiment the frame data is sent to the field display for rendering. At block 468, in one embodiment the foveal image is not displayed. In one embodiment, the frame is dropped. In another embodiment, the foveal display is turned off momentarily. In one embodiment, the foveal display is not considered within range if the user eye tracking indicates that the user's gaze has moved too far outside of the baseline reference.

At block 470, the field display image is rendered, without the image cut-out and without the display or rendering of the foveal image. At block 472, the field display image is displayed. The process then ends.

FIG. 5A illustrates one embodiment of the display including a foveal display sub-system 510 and a field display sub-system 550. The foveal display sub-system 510 includes a display panel 515 or another image source, and intermediate optics 520, in one embodiment. The output of the intermediate optics 520 is directed to an adjustable mirror 525 or other element which provides positioning. The adjustable mirror 525 directs the image to partial mirror 530 and curved partial mirror 535, which direct the image toward the user's eye 590. In one embodiment, the adjustable mirror 525 may be replaced by a tunable prism, in which one surface of a prism is moved to adjust the angle such as the Tunable prism TP-12-16 from OPTOTUNE™. In one embodiment, the adjustable mirror 525 may be replaced by an acousto-optical modulator and mirror. In one embodiment, each of these elements may be replaced with similar elements, which enable the selective movement of the high resolution display to be directed to align with the center of the field of view of the user's eye 590. The field display sub-system 550 in one embodiment includes a projection sub-system 555 and a light guide 560. Alternative embodiments may utilize different projection methods for the field display sub-system 550.

FIG. 5B illustrates one embodiment of roll-off which may be used to blend the foveal image with the field image. In one embodiment, the system resolution roll-off comprises magnifying the edges of the display to show lower resolution data outside the foveal area. This also increases the field of view. Magnification may be provided in various ways using hardware, software, or a combination. FIG. 5B illustrates an exemplary display 580 showing the distribution of the pixel density, as the resolution rolls off. As can be seen in the center, the pixels are uniform size (illustrated by the central polygon 585). Toward the edge of the display area the pixel size gets larger, and distorts. This can be seen in left polygon 595. Because the distance between pixel edges increases both horizontally and vertically, in one embodiment the pixels which are horizontally and vertically removed from the central area are more distorted, and larger, as can be seen in bottom polygon 1680. Note that FIG. 5B illustrates a relatively small display and the ratio between the central polygon 585, and a corner polygon 595 may range from greater than 1 to less than or equal to 10.

Figure 6:
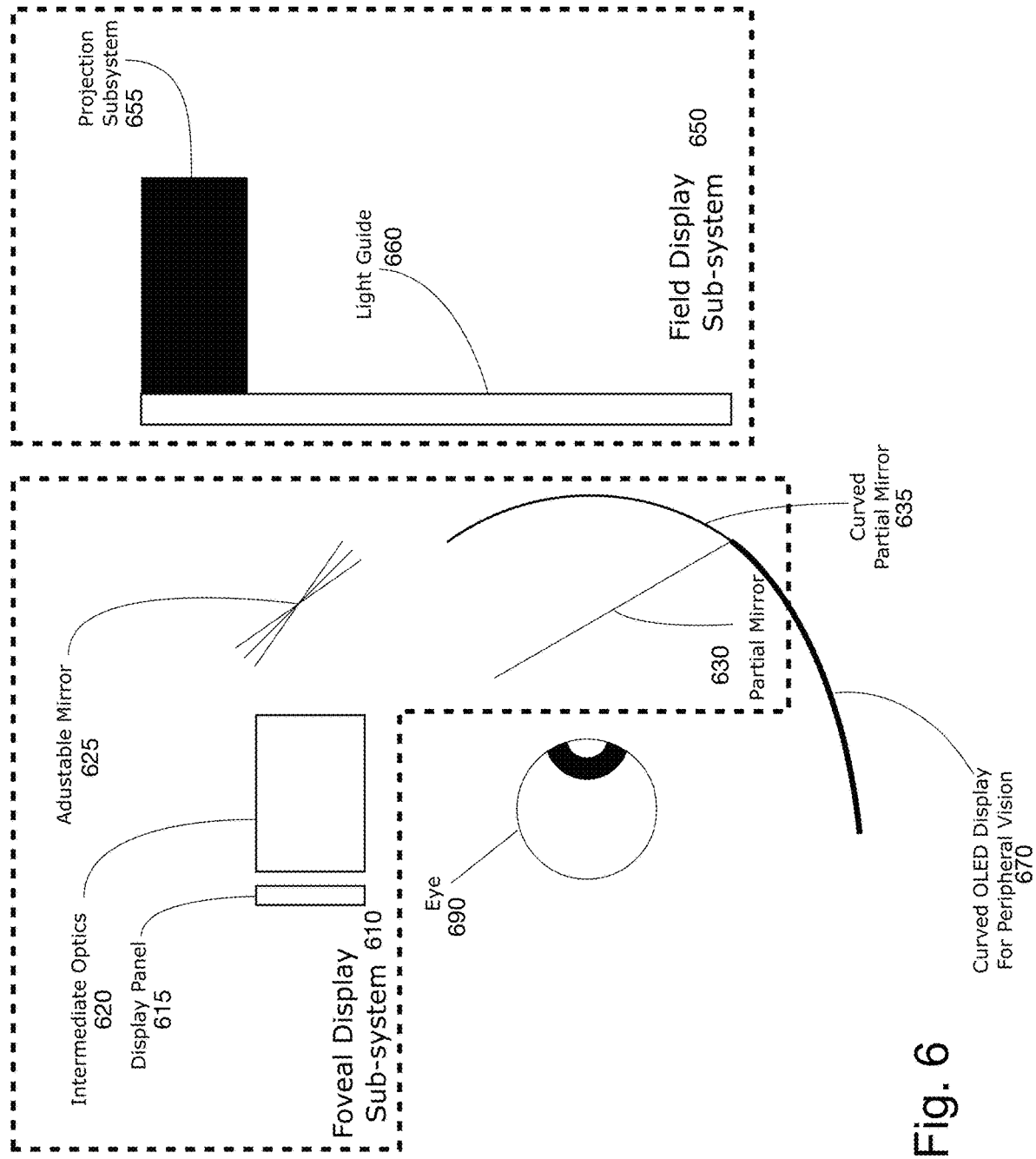
FIG. 6 is an illustration of one embodiment of a hybrid display.

FIG. 6 illustrates another embodiment of the display including a foveal sub-system 610 and a field display sub-system 650. In addition to those two sub-systems, the embodiment of FIG. 6 includes a peripheral vision display 670. The peripheral vision display in one embodiment is an OLED display.

Figure 7:
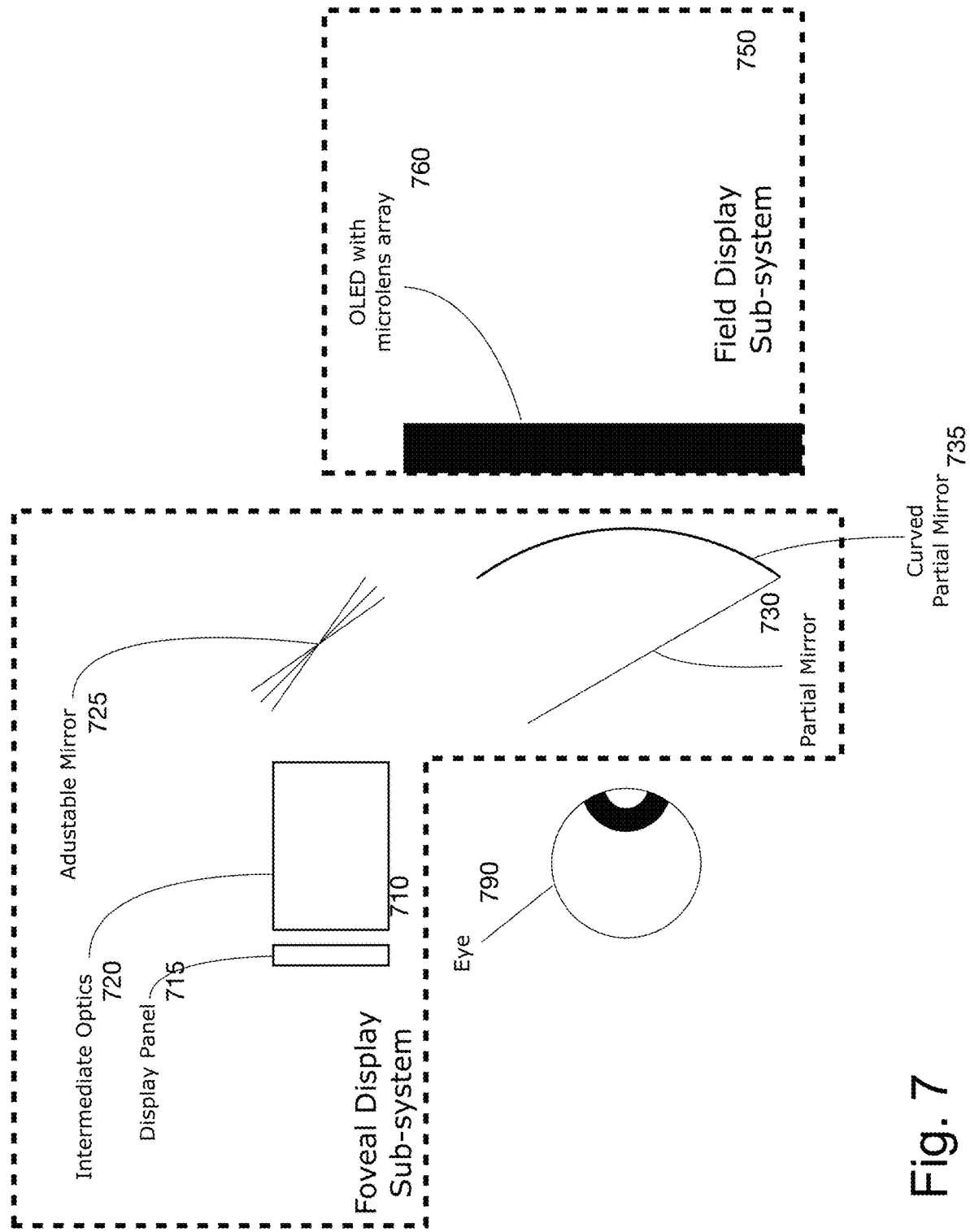
FIG. 7 is an illustration of one embodiment of a hybrid display.

FIG. 7 illustrates another embodiment of the display including a foveal display sub-system 710 and a field display sub-system 750. The field display sub-system in this embodiment is an OLED with microlens array 760.

Figure 8:
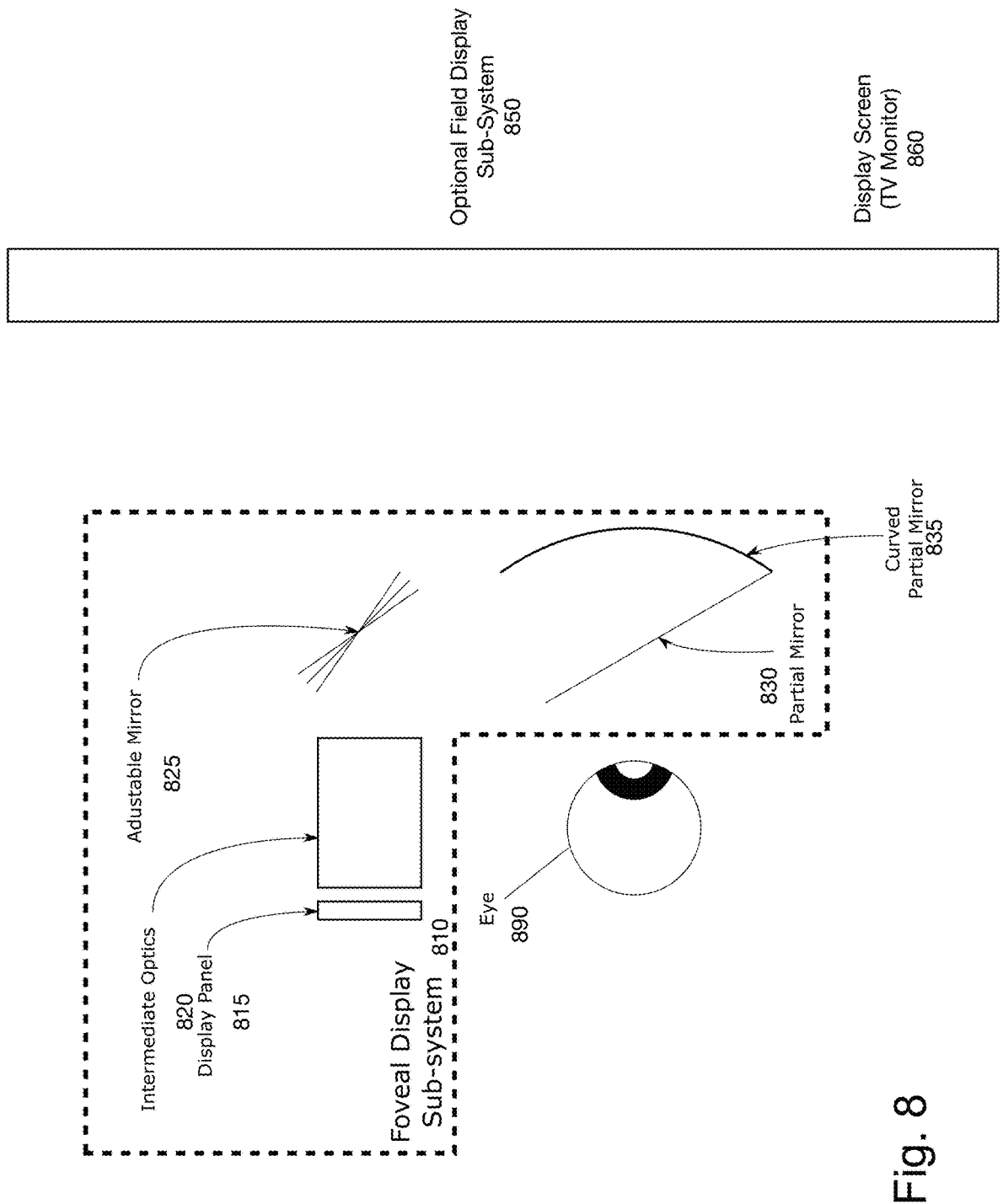
FIG. 8 is an illustration of one embodiment of a hybrid display.

FIG. 8 illustrates another embodiment of the display including a foveal display sub-system 810 and an optional field display sub-system 850. In this embodiment, the foveal display sub-system 810 may be implemented in glasses or goggles, being worn by the user. The optional field display sub-system 850 in one embodiment may be a display screen such as a TV monitor 860. The field display sub-system 850 may be a modular element which may be optionally attached to the glasses or goggles. In one embodiment, the system may provide a high resolution image only through the foveal display sub-system 810. When the user does have the optional field display sub-system 850 available, the rendering system (not shown) can communicate with the foveal display sub-system 810 and field display sub-system 850 provide a wider field of view. In one embodiment, in this configuration, the foveal display sub-system may provide up to 20 degree field of view.

Figure 9:
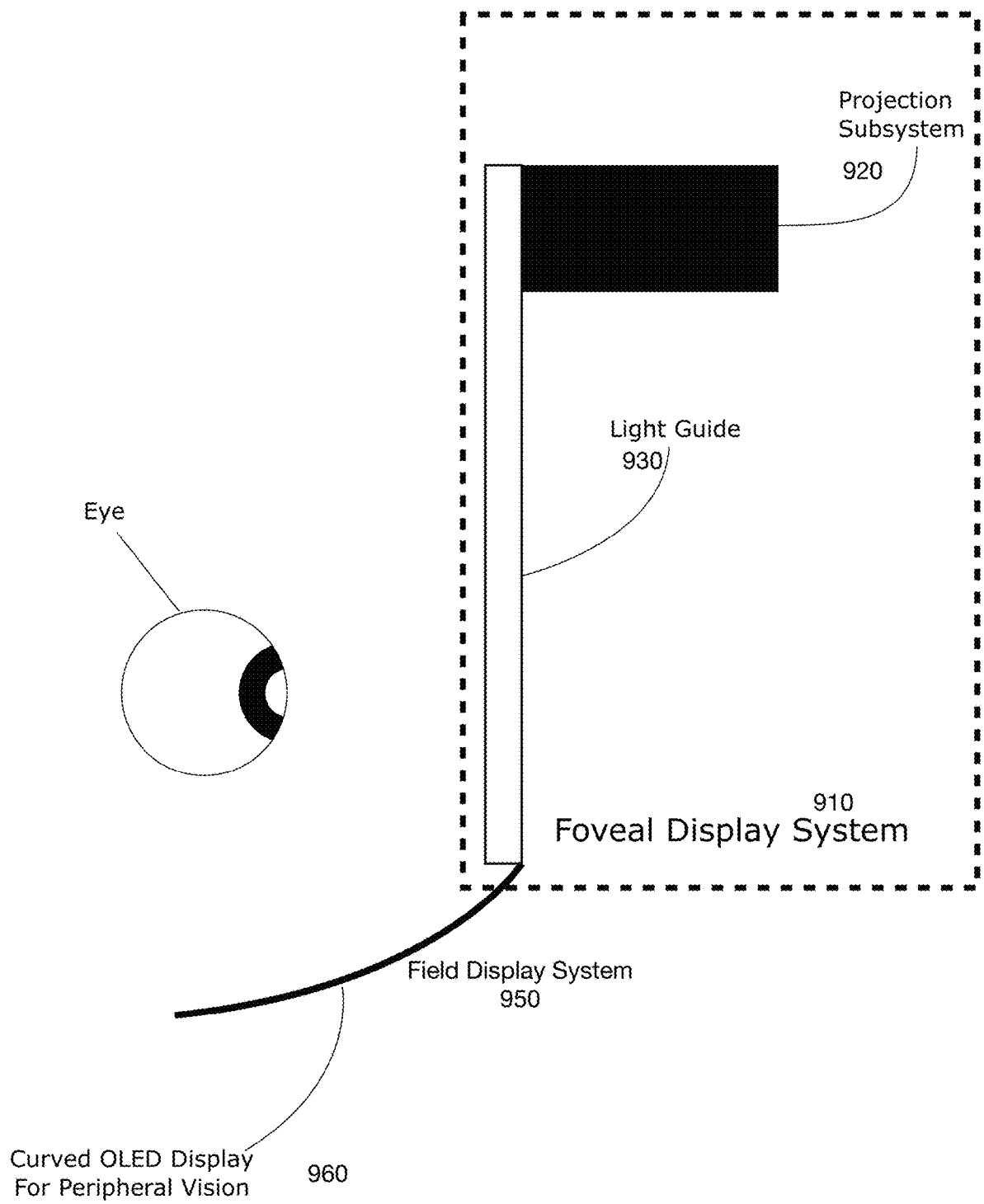
FIG. 9 is an illustration of one embodiment of a hybrid display.

FIG. 9 illustrates another embodiment of the display including a foveal display sub-system 910 and a field display sub-system 950. In this embodiment, the foveal display sub-system 910 comprises a light guide 930 that has a FoV of 40-55°, coupled with a projector 920 which acts as a display panel, like an OLED microdisplay. In one embodiment, the display panel 920 only sends a small image, associated with the area that covers the foveal region of the user's field of view instead of sending the full 40-55° image. The rest of the waveguide 930, outside of the spot, would be transparent. Outside of the foveal region, this could be filled in with a lower resolution field display 950, such as an OLED display 960.

Figure 10:
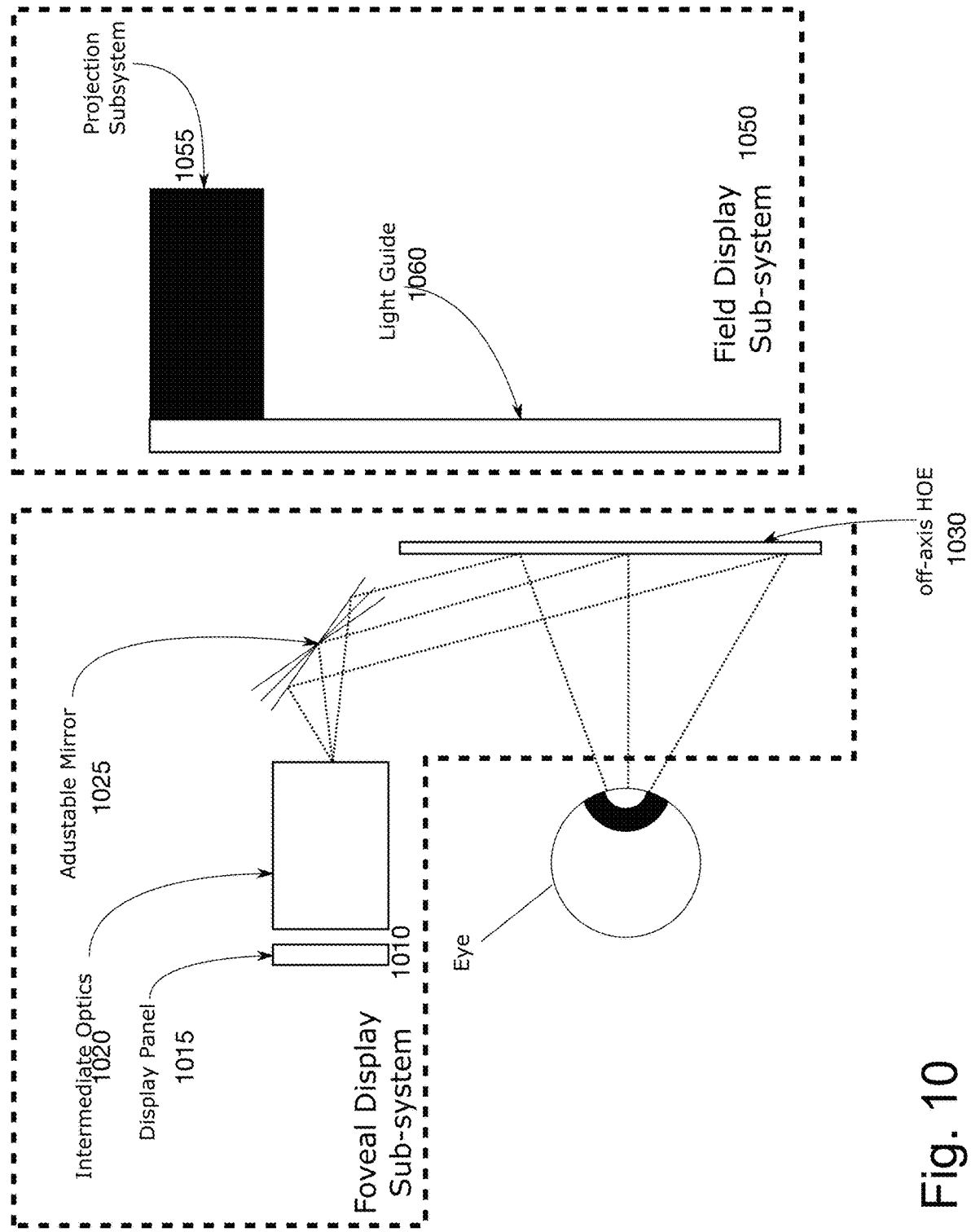
FIG. 10 is an illustration of one embodiment of a hybrid display.

FIG. 10 illustrates another embodiment of the display including a foveal display sub-system 1010 and a field display sub-system 1050. In this embodiment, the foveal display sub-system 1010 includes a display panel 1015, intermediate optics 1020, an adjustable mirror 1025 directing the light to an off-axis holographic optical element (HOE) 1030. The HOE 1030 guides the light from the display 1015 to the user's eye. The adjustable mirror 1025 provides the movement to enable the foveal display sub-system 1010 to be correctly positioned. In one embodiment, the field display sub-system 1050 comprises a projection subsystem 1055 and a light guide 1060.

Figure 11:
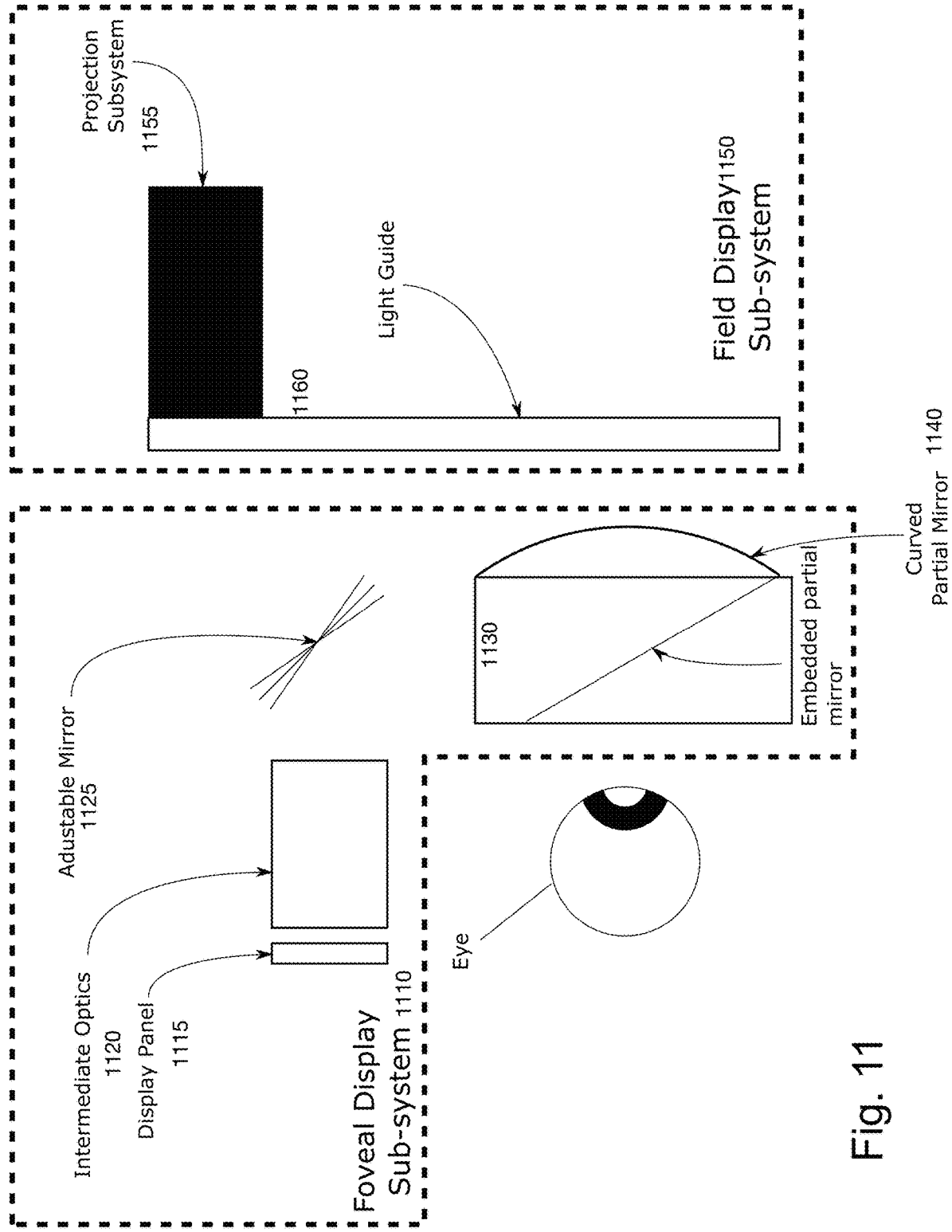
FIG. 11 is an illustration of one embodiment of a hybrid display.

FIG. 11 illustrates another embodiment of the display including a foveal display sub-system 1110 and a field display sub-system 1150. In this embodiment, the foveal display sub-system 1110 includes a display panel 1115, intermediate optics 1120, an adjustable mirror 1125 directing the light to a prism with an embedded partial mirror 1130. The light from the embedded partial mirror in the prism 1130 is reflected by a curved partial mirror 1140 to the user's eye. The adjustable mirror 1125 provides the movement to enable the foveal display subsystem 1110 to be correctly positioned. In one embodiment, the field display sub-system 1150 comprises a projection subsystem 1155 and a light guide 1160.

Figure 12:
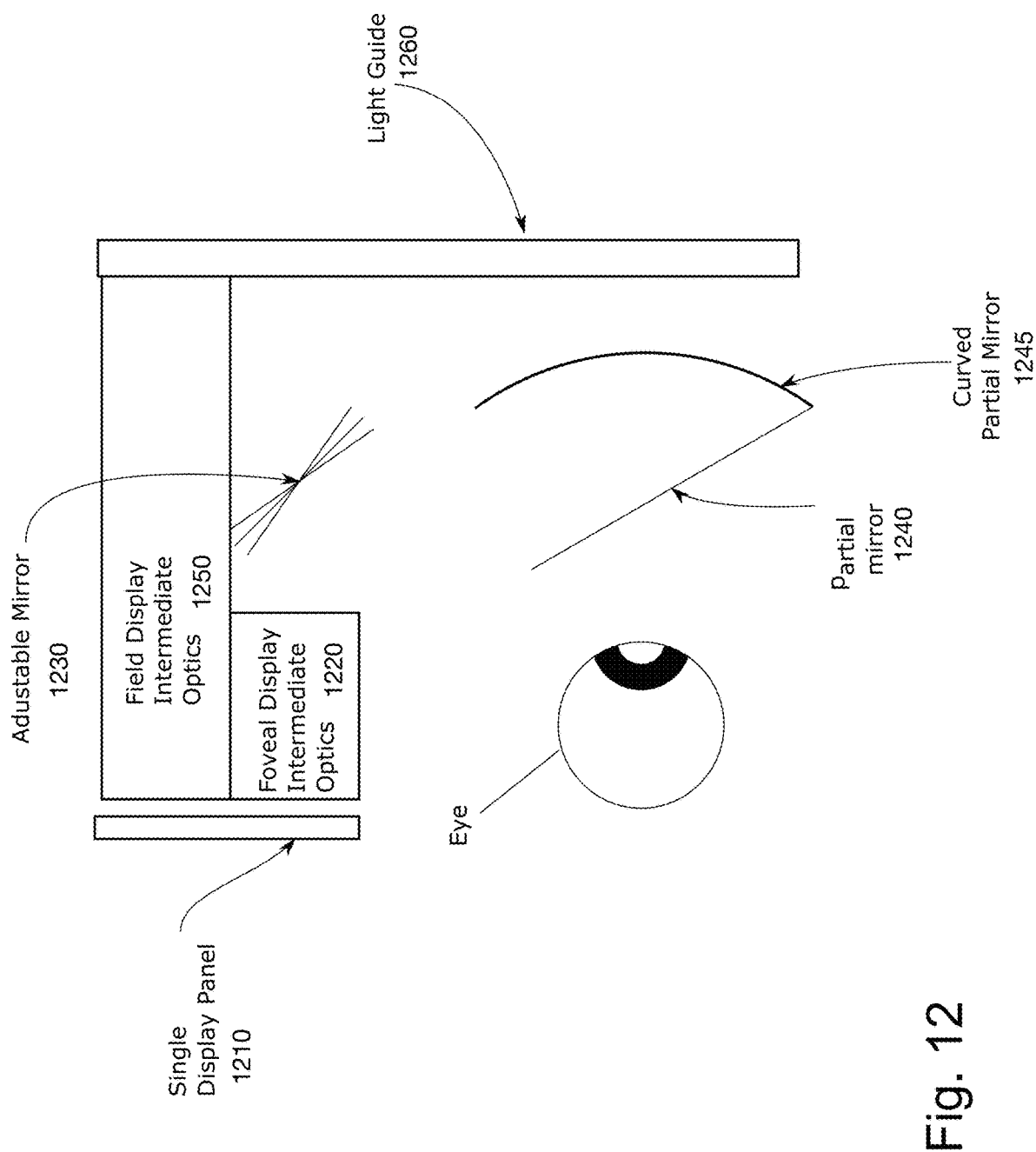
FIG. 12 is an illustration of one embodiment of a hybrid display using time multiplexing.

FIG. 12 illustrates another embodiment of the display which provides a spatially multiplexed high resolution display and a low resolution display. In the embodiment of FIG. 12, the light is provided by a single display panel 1210. The single display panel 1210 displays two separate images, the foveal display portion and the field display portion. The foveal display portion passes through foveal display intermediate optics 1220, an adjustable mirror 1230, and a partial mirror 1240 and curved partial mirror 1245. In one embodiment, the mirrors 1240, 1245 may be replaced by another mechanism to redirect the light.

The field display image portion from the single display panel 1210 goes to field display intermediate options 1250, which passes them to light guide 1260, in one embodiment. This enables a single display panel 1210 to provide the data for both the foveal display and the field display, utilizing spatial multiplexing. In one embodiment, the relative size of the image on the display panel 1210 for the foveal display portion and the field display portion are not identical. In one embodiment, the display size is identical, but the field display intermediate optics 1250 enlarge the portion of the image which will be utilized as the field display.

Figure 13A:
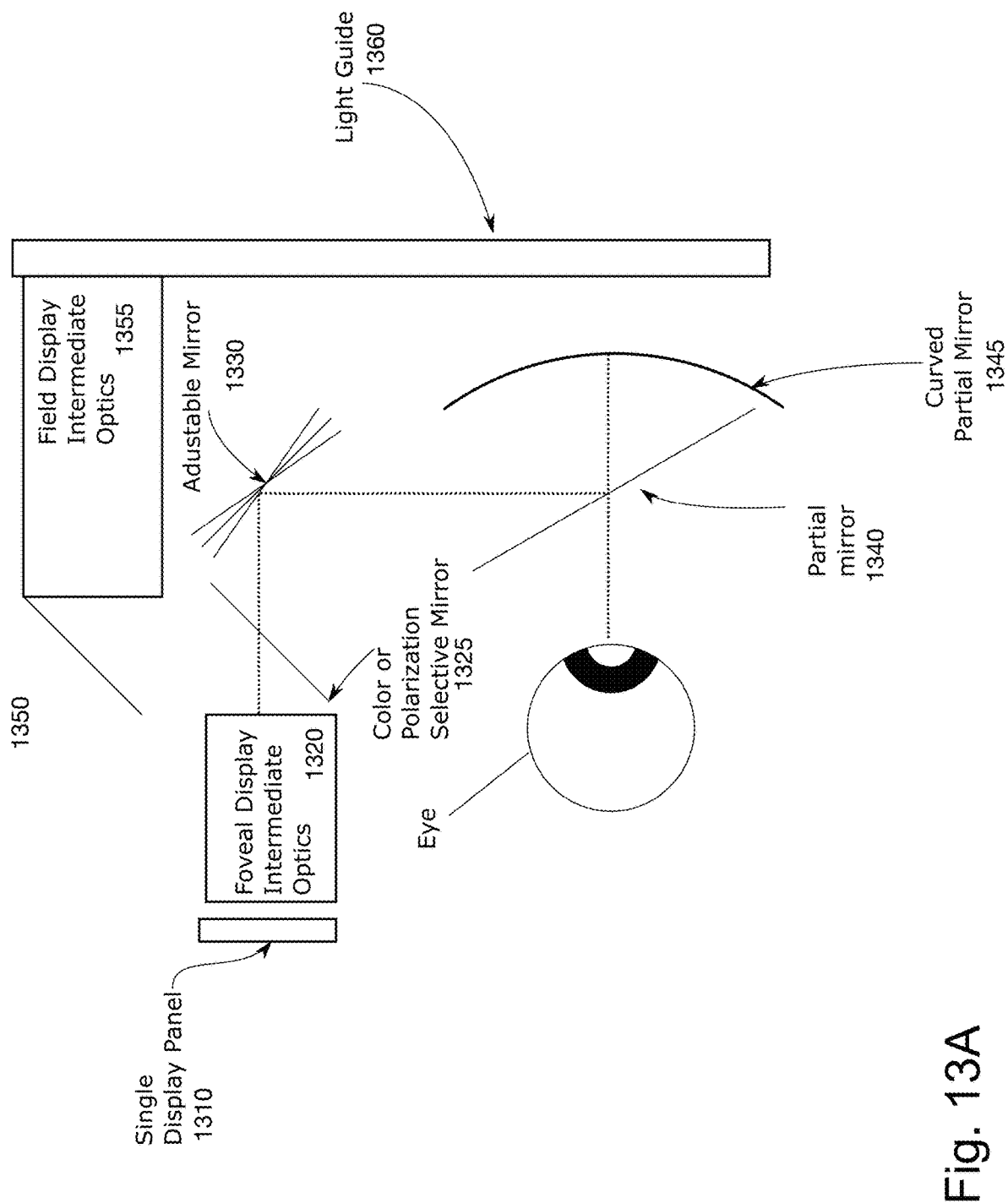
FIGS. 13A and 13B are an illustration of one embodiment of a hybrid display using time multiplexing.
Figure 13B:
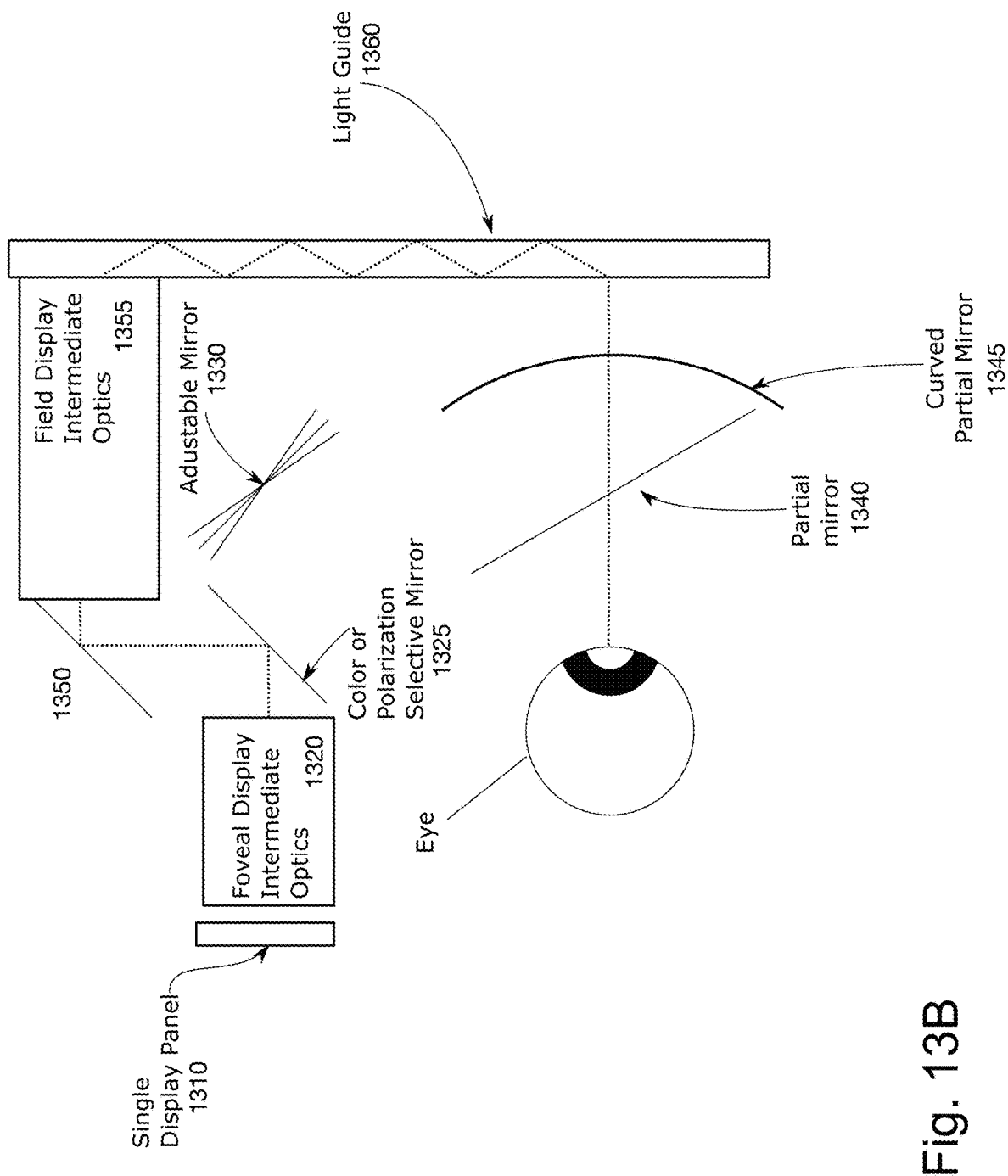

FIGS. 13A and 13B illustrate one embodiment of a time multiplexed display including a foveal image and a lower resolution field display image. The system utilizes a single display panel 1310 and a color or polarization selective mirror 1325 which selectively sends the data through (for foveal image data) or reflects it to the field display intermediate optics 1355. The display panel 1310 displays foveal image data and lower resolution field display data in a time multiplexed way, e.g. alternating frames at a speed fast enough to create two sets of images in human perception.

FIG. 13A illustrates the light path for the foveal image frame. The data goes through foveal display intermediate optics 1320, and then is directed through the color or polarization sensitive mirror 1325. It is reflected by adjustable mirror 1330. In one embodiment, a partial mirror 1340 and curved partial mirror 1345 are used to direct the image to the user's eye. In one embodiment, additional foveal display intermediate optics 1320 may be positioned after the color or polarization selective mirror 1325. Alternate configurations for directing the image may be used.

FIG. 13B illustrates the light path for the field display image data. The image data from the single panel display 1310 travels through foveal display intermediate optics 1320 before being reflected by the color or polarization selective mirror 1325, toward the field display intermediate optics. In one embodiment, one or more redirecting mirrors 1350 may be used to direct the light. From the field display intermediate optics 1355 the light goes through a light guide 1360. The output then passes through the curved partial mirror 1345 and partial mirror 1340 to the user's eye.

By switching the display rapidly between the foveal image and the field display image, the system displays the two images in a time multiplexed way so that both are simultaneously perceived by the user.

FIGS. 14A and 14B illustrate one embodiment of a foveal display sub-system using a waveguide. This configuration of the foveal display sub-system may be used in any of the embodiments described above, in one embodiment. In one embodiment, the foveal image utilizes the display panel 1410. The output of display panel 1410 passes through optics 1420. Though optics 1420 is illustrated as a single lens, one of skill in the art would understand that any intermediate optics element may be included as optics 1420. The output of optics 1420 passes to steering element 1430, which steers it into the light guide in-couplers 1440. Steering element 1430 direct the light to the appropriate portion of the light-guide in-coupler 1440. The image data then passes through the light guide 1450, and out through light-guide out-coupler 1460 to the user's eye. The steering element 1430 correctly directs the light for the foveal image, adjusted to the user's eye position.

Figure 15A:
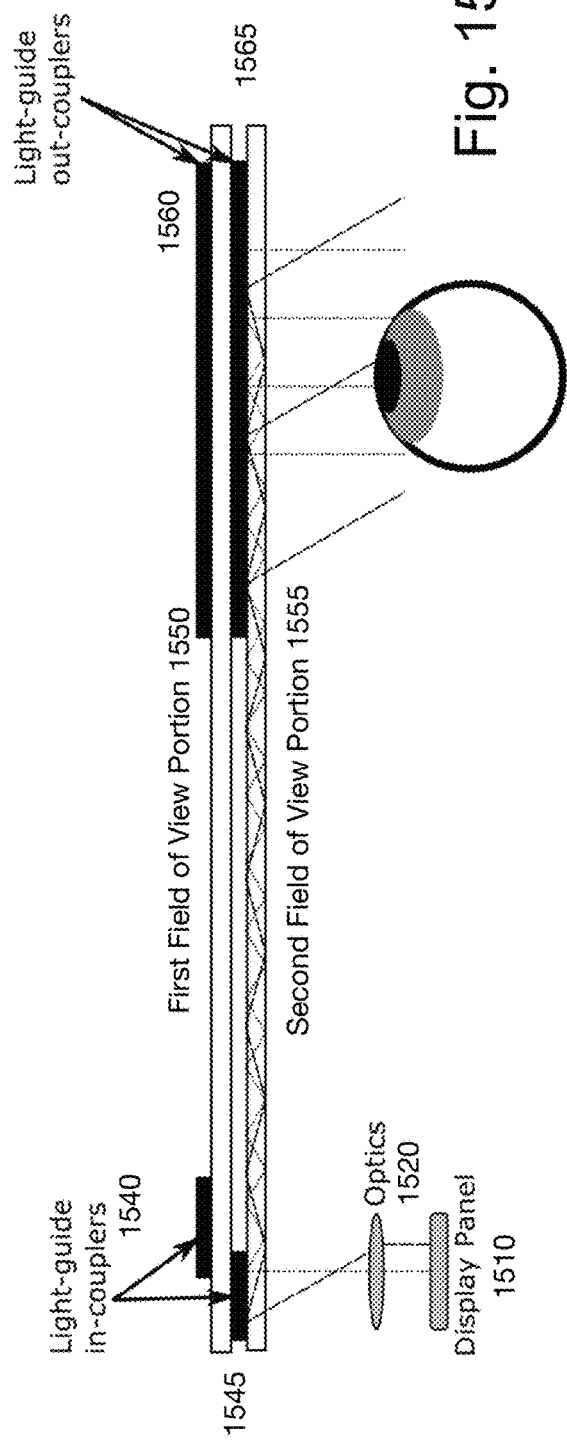
FIGS. 15A and 15B is an illustration of one embodiment of a field display using a waveguide which may be used in the systems above.
Figure 15B:
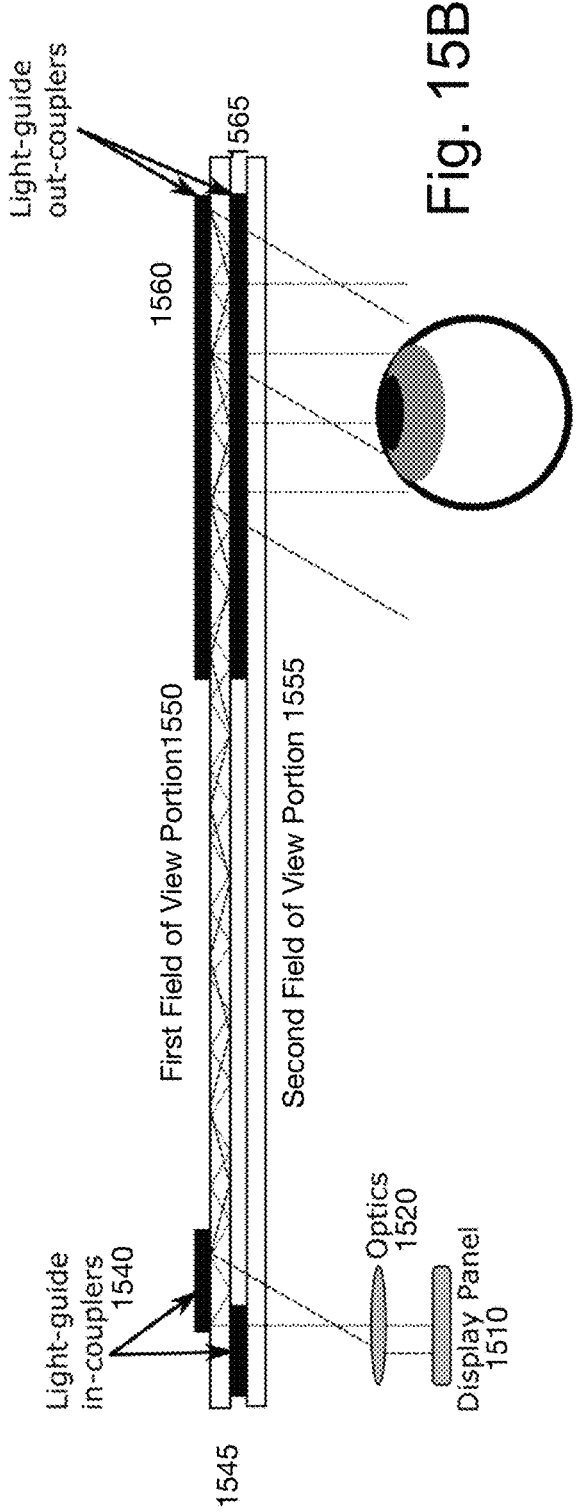

FIGS. 15A and 15B illustrate one embodiment of field display image using a multi-layer light guide. This stacked waveguide may be used in the configurations described above for the field display. In this example, there are two waveguides, one for each portion of the field of view. In another embodiment, there may be four stacked waveguides.

The output of display panel 1510 pass through optics 1520. Though optics 1520 is illustrated as a single lens, one of skill in the art would understand that any intermediate optics element may be included as optics 1520. The output of optics 1520 pass to the light guide in-couplers 1540, 1545. In one embodiment, optics 1520 split the data from display panel 1510 based on color or polarization, and direct it to one of the light guide in-couplers 1540, 1545. In this example, the top light guide 1550 is used for the first field of view portion of the image, and the bottom light guide 1555 is used for the second field of view portion of the image. The output from the foveal light guides 1550, 1555 are directed by the light guide out coupler 1560, 1565 to the user's eye.

Figure 16A:
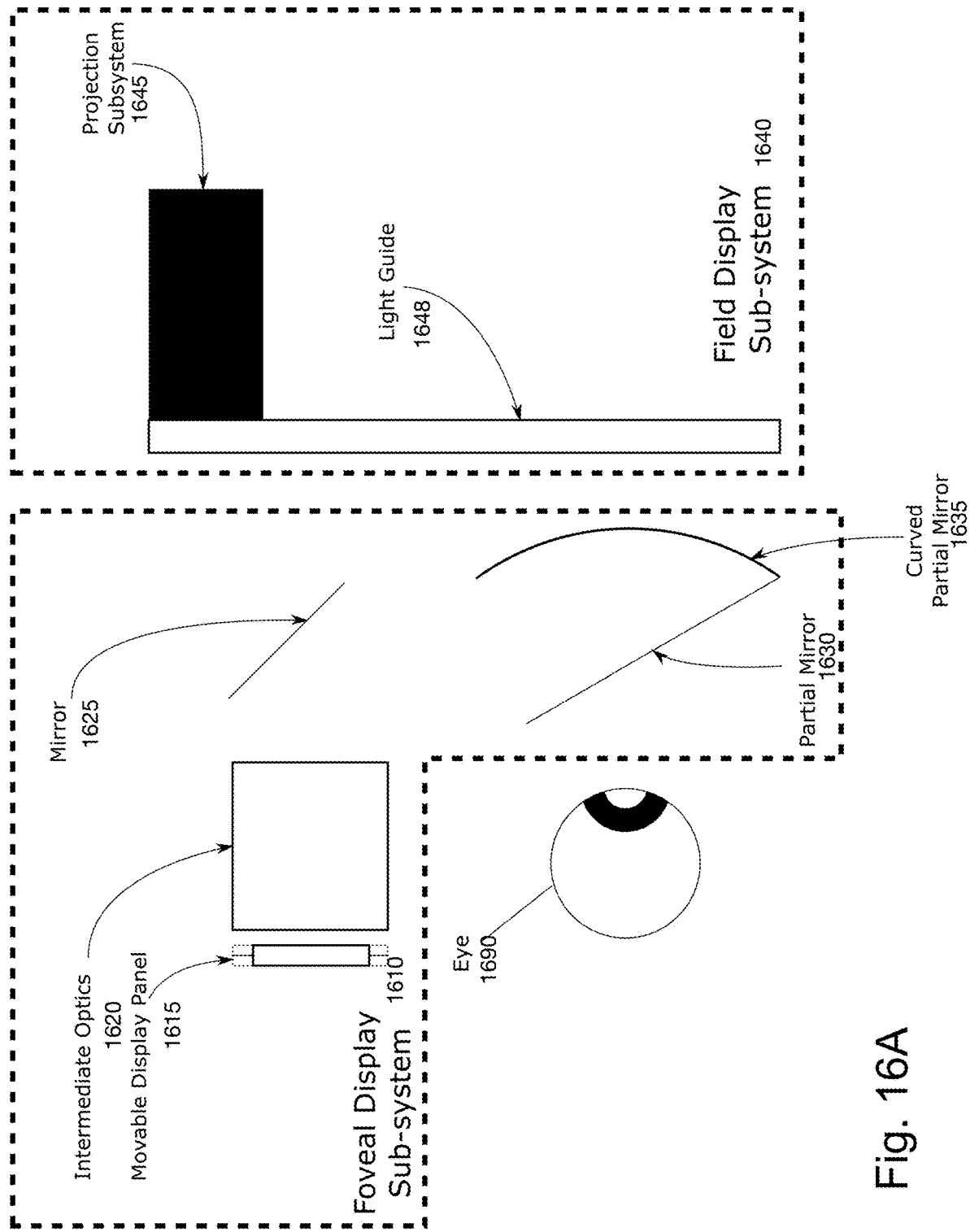
FIG. 16A is an illustration of another embodiment of a hybrid display system.

FIG. 16A illustrates another embodiment of the display including a foveal display sub-system 1610 and a field display sub-system 1640. This configuration is similar to the configuration described above with respect to FIG. 5, however instead of using an adjustable mirror, a movable display panel 1615 is used to position the foveal display for the user's eye. This configuration for the movable element of the foveal display sub-system may be utilized in the systems described above, replacing the adjustable mirror.

Figure 16B:
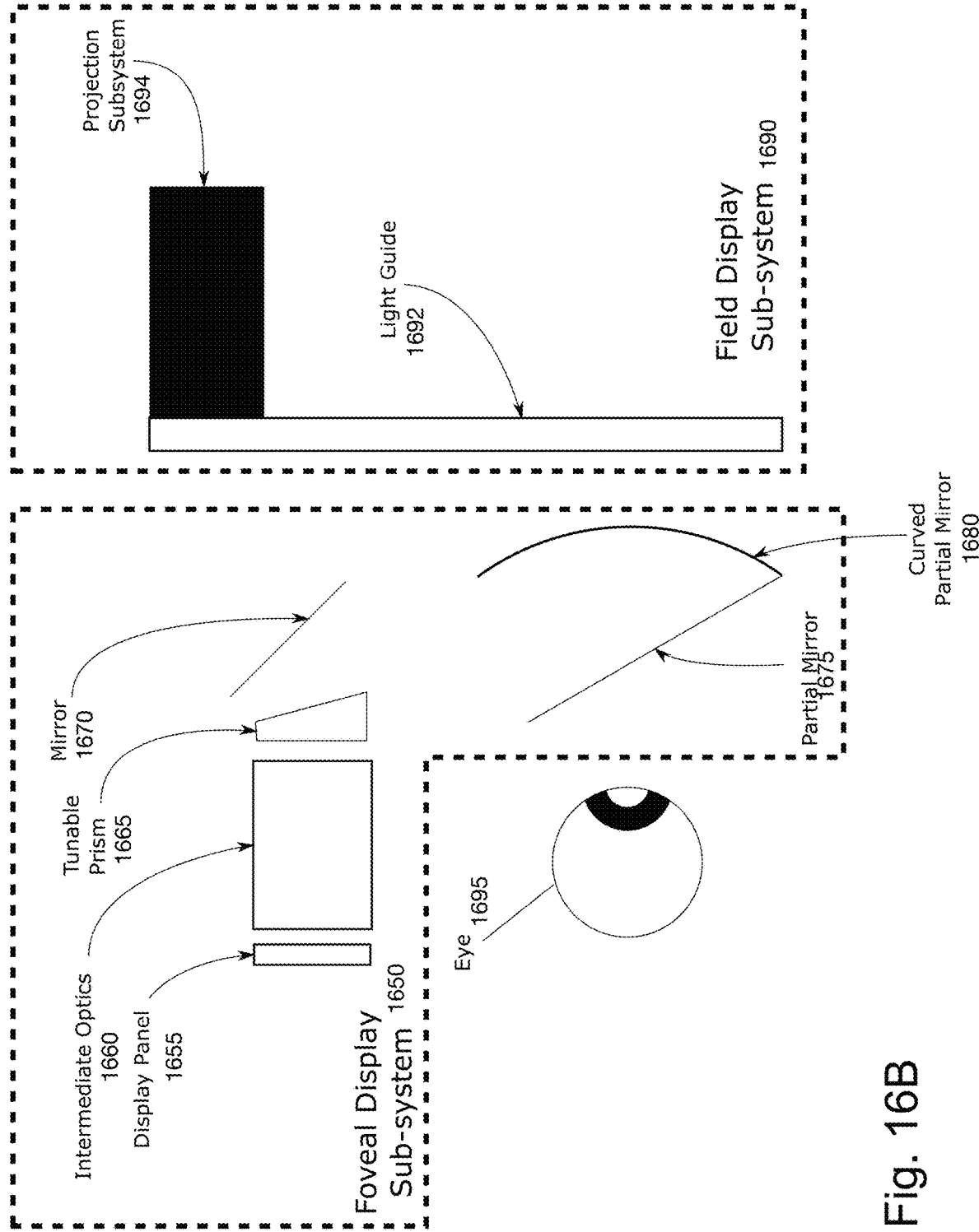
FIG. 16B is an illustration of another embodiment of a hybrid display system.

FIG. 16B illustrates another embodiment of the display including a foveal display sub-system 1650 and a field display sub-system 1690. This configuration is similar to the configuration described above with respect to FIG. 5, however instead of using an adjustable mirror, a tunable prism 1665 is used to position the foveal display for the user's eye. In this embodiment, one surface of the tunable prism is moved to adjust the angle such to position the foveal image. The tunable prism may be tunable prism TP-12-16 from OPTOTUNE™. This configuration for the movable element of the foveal display sub-system may be utilized in the systems described above, replacing the adjustable mirror with the tunable prism 1665. In another embodiment, the adjustable mirror 525 may be replaced by an acousto-optical modulator and mirror. This configuration for the movable element of the foveal display sub-system may be utilized in the systems described above, replacing the adjustable mirror.

Note that the configurations shown in FIGS. 5 through 16A are presented with optics, and particular layouts. However, the design does not require the particular layouts, and additional optical elements may be utilized in the system. Furthermore, elements may be mixed and matched between the configurations.

Figure 17:
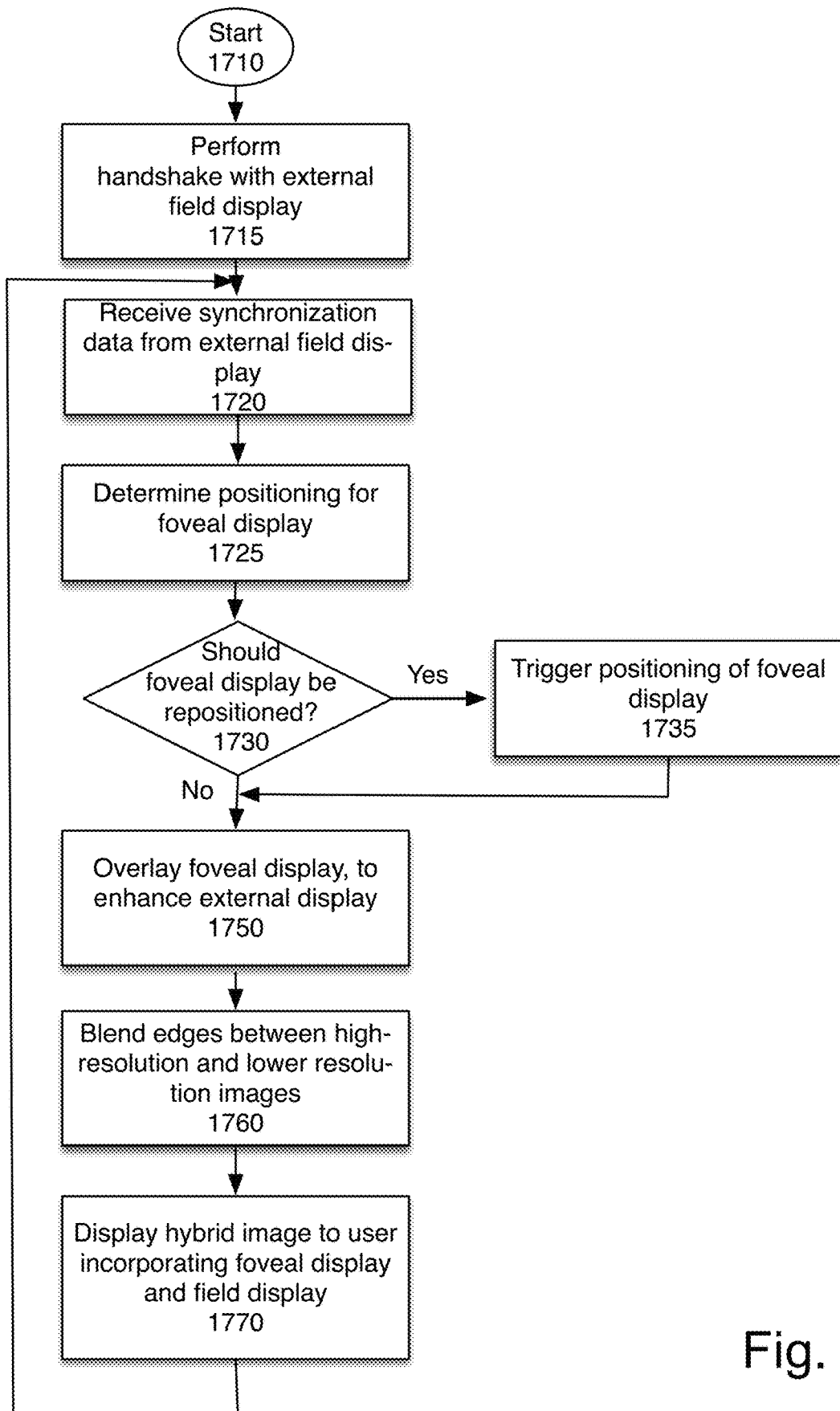
FIG. 17 is a flowchart of one embodiment of using the foveal display with an external display.

FIG. 17 is a flowchart of one embodiment of using the foveal display with an external display. An external display is a display not controlled by the same system as the foveal display. For example, the external display may be a projected system, for example in virtual reality (VR) cave or another environment which provides a field display. In one embodiment, the user may wear an augmented reality (AR) or virtual reality (VR) headset, which interacts with the environment to provide the hybrid display, with the AR/VR headset providing foveal display, in addition to the field display provided by other systems.

The process starts at block 1710. At block 1715, a handshake is performed between the foveal display system and the external display system. In one embodiment, the handshake establishes that both systems are capable of working together to provide the combination display. In one embodiment, the handshake comprises setting up a connection between the foveal display system and the field display system.

At block 1720, synchronization data is set from the external display system. Because the foveal system is designed to be fully synchronized with the external system, in one embodiment, this synchronization signal provides the frame data.

At block 1725, the positioning for the foveal display is determined. As noted above, this determination may be based on the user's gaze vector, predicted gaze, or smart positioning based on data from the frame being displayed.

At block 1730, the process determines whether the foveal display should be repositioned, to be displaying at the selected location. If so, at block 1735, the positioning is triggered.

At block 1750, the foveal display is overlaid, to enhance the external display. In one embodiment, because the external display is separate, it does not include a cut-out logic. In another embodiment, there may be a cut-out logic which keeps the system from rendering a portion of the low-resolution image from the location at which the foveal display image is shown.

At block 1760, a blur is applied to blend the edges between the foveal display and field display images. The hybrid image including the foveal image and the field image is displayed to the user, at block 1770. In this way, the user can have an enhanced viewing quality when entering a VR cave or other display environment which has a large field of view but field display. The process then loops back to block 1720 to continue the process, until the video or other display ends.

Figure 18:
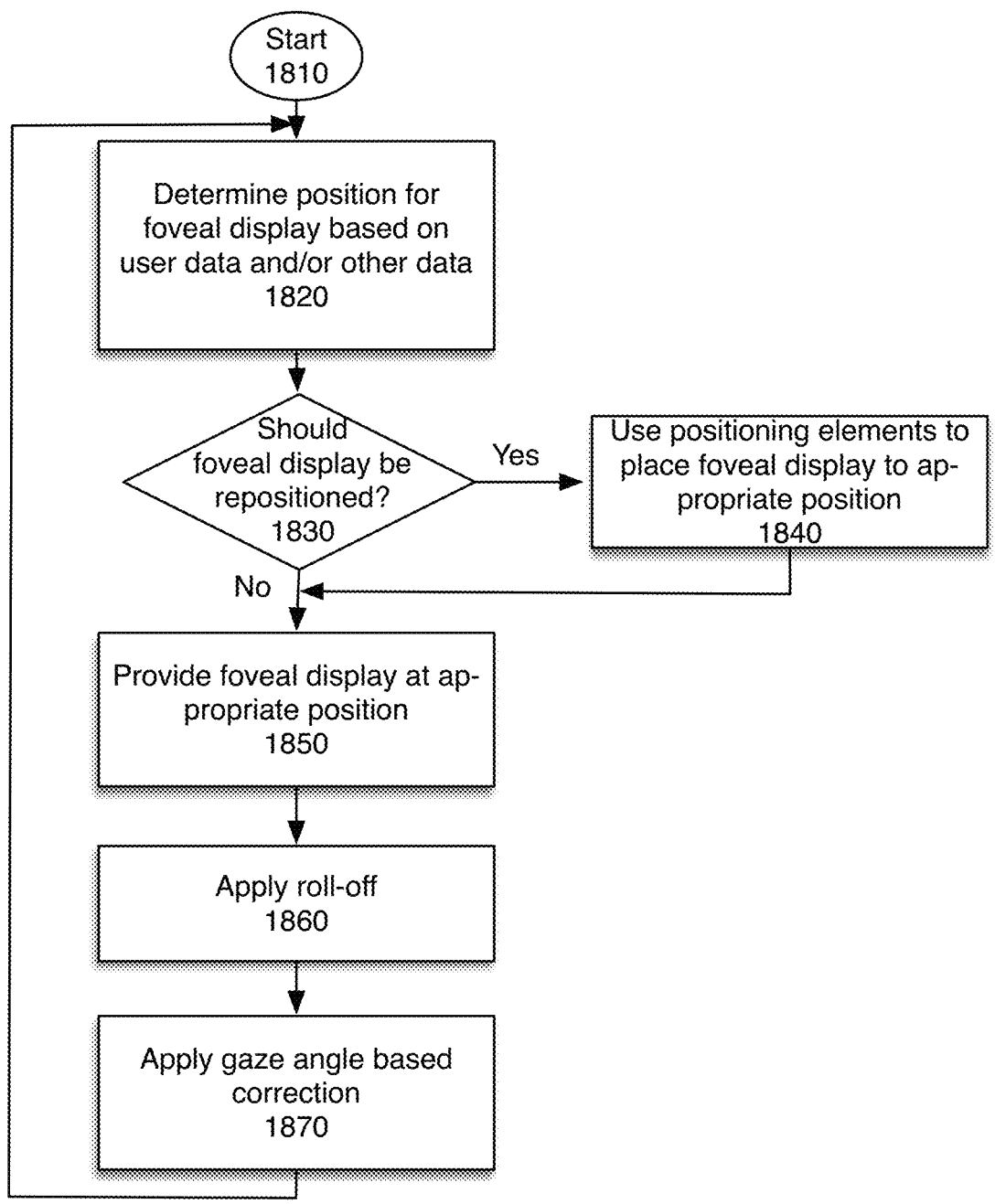
FIG. 18 is a flowchart of one embodiment of using a foveal display with no associated larger display.

FIG. 18 is a flowchart of one embodiment of using a foveal display without an associated field display. In this case, the system provides only a foveal display, without the field display discussed above. However, in one embodiment, the foveal display may have blending or magnification applied to increase the field of view.

At block 1820, the process determines the position for the foveal display, based on user data, or other data. The user data may include gaze vector, predicted gaze vector, etc. The external data may include information about the image data which will be displayed.

At block 1830, the process determines whether the foveal display should be repositioned. The display may not need to be repositioned for multiple frames because the user's gaze is unvarying. If the position should be altered, at block 1840 the foveal display is adjusted. In one embodiment, the adjustment may include a steerable eye box to correct for eye position. In one embodiment, the adjustment may include shifting the position of the display with respect to the foveal region of the user's field of view. In one embodiment, the foveal display is turned off during the move, if the move is greater than a certain distance. In one embodiment, the distance is more than 0.5 degrees. In one embodiment, if the user is blinking during the move, the foveal display may not be turned off.

At block 1850, the foveal display is provided at the appropriate position for the user.

At block 1860, in one embodiment, roll-off is provided at the edges of the display. Roll-off includes in one embodiment resolution roll-off (decreasing resolution toward the edges of the display area). Roll-off includes in one embodiment brightness and/or contrast roll off (decreasing brightness and/or contrast toward the edges.) Such roll-off is designed to reduce the abruptness of the end of the display. In one embodiment, the roll-off may be designed to roll off into "nothing," that is gradually decreased from the full brightness/contrast to gray or black or environmental colors.

In one embodiment, resolution roll-off comprises enlarging the pixel size at the edges of the foveal display to better blend with the lower resolution field display image outside the foveal area. This also increases the field of view. Magnification may be provided in various ways using hardware, software, or a combination. FIG. 5B illustrates an exemplary display showing the distribution of the pixel density, as the resolution rolls off.

At block 1870, the appropriate gaze angle based correction is applied to the image. As the gaze vector changes from the straight ahead, there is increased distortion across the field of view. Gaze angle based correction utilizes the known gaze angle, used for positioning, to correct for any distortion in software. The process then returns to block 1820. In this way, the steerable foveal display may be used to provide a steerable foveal display following the user's gaze, or other cues. In one embodiment, the foveal display may provide a variable field of view.

Figure 19:
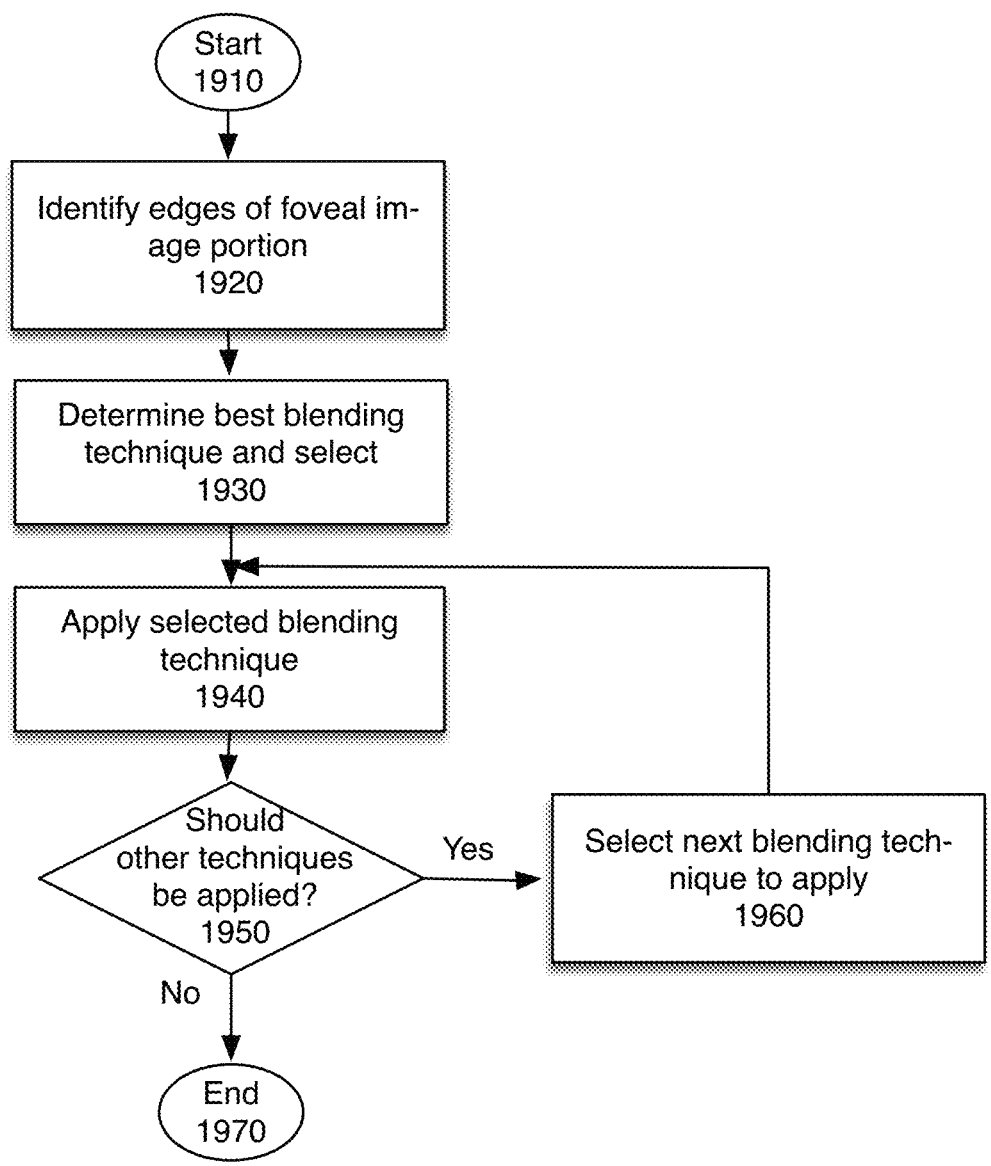
FIG. 19 is a flowchart of one embodiment of blending edges of the foveal display.

FIG. 19 is a flowchart of one embodiment of blending edges of the foveal display. The process starts at block 1910. As discussed above, when the foveal display is positioned with a field display, the edges between the displays are blended. This creates a continuous impression for the user. This process in one embodiment corresponds to block 440 of FIG. 4, and block 1760 of FIG. 17.

At block 1920, the process identifies the edges of the foveal image. The edges, in one embodiment, are defined by the field of view available to the foveal display. In another embodiment, the foveal display may display a field of view less than the maximum it can display.

At block 1930, the process determines the best blending technique, and applies it. In one embodiment, the blending techniques may include blending using an alpha mask, dithered blend, interlacing pixels, color based alpha channel blending, pixel based alpha channel blending, multi-sample antialiasing (MSAA), temporal filtering blending, and/or other blending techniques.

At block 1950, the process determines whether other techniques should be applied. If so, at block 1960 the next technique is selected, and the process returns to block 1940. If not, the process ends at block 1970. As noted above, in one embodiment this process is invoked with each frame that includes a high resolution foveal display image and a lower resolution field display image superimposed. In one embodiment, when the foveal display shows a sprite or other image element that is superimposed on a background, no blending may be applied.

Figure 20:
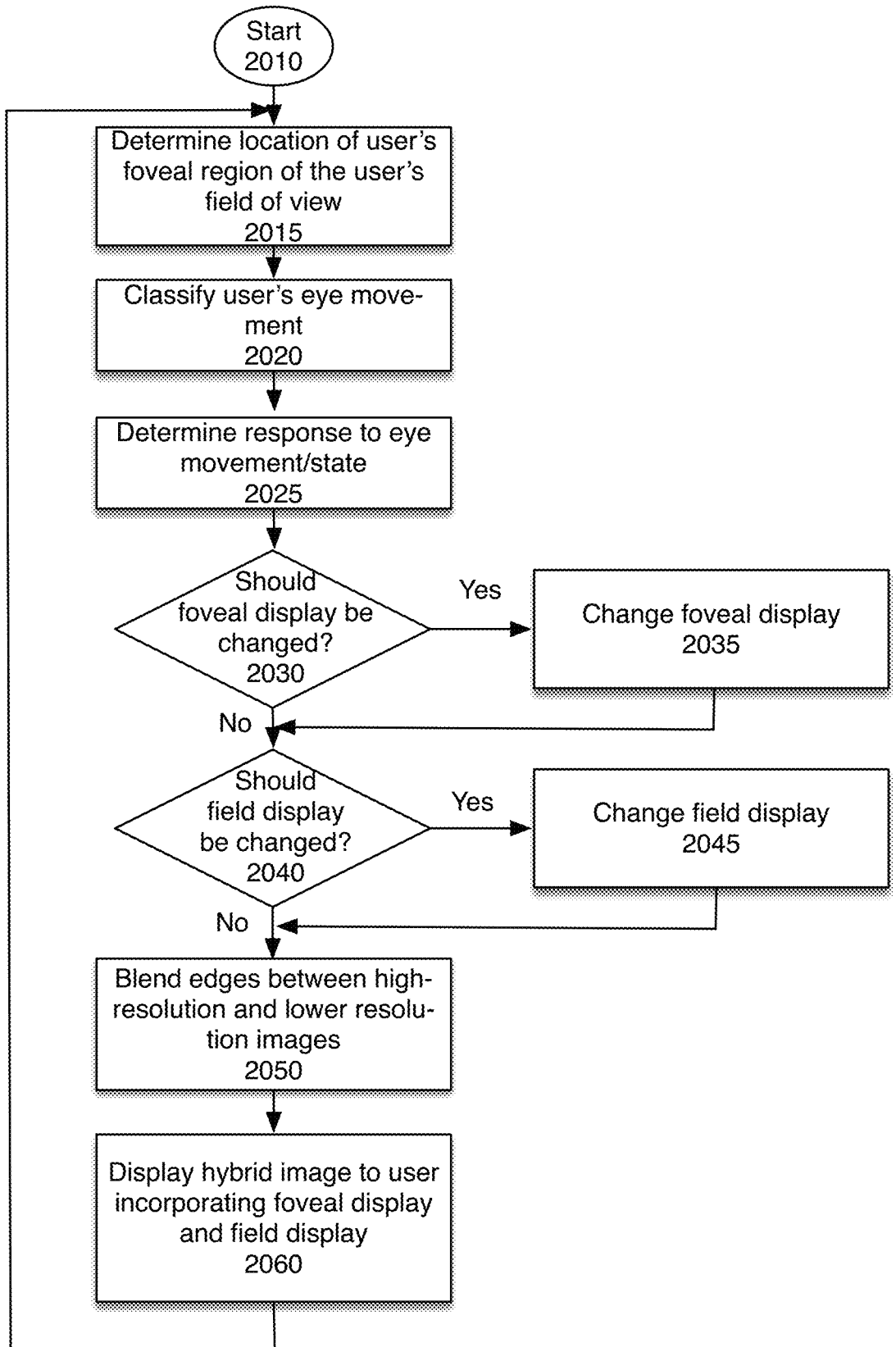
FIG. 20 is a flowchart of one embodiment of using eye movement classification.

FIG. 20 is a flowchart of one embodiment of using eye movement classification. Eye movement classification is used to predict the future location of the user's eye for positioning the foveal display. The process starts at block 2010. At block 2015, the location of the foveal region of the user's field of view is determined 2015. At block 2020, the user's eye movement is classified. FIG. 21 illustrates some exemplary eye movements that may be identified. The eye movements include fixated, blinking, micro-saccade, slow pursuit, and fast movement/saccade. In one embodiment, in addition to the eye movement, the head position may be used in classifying the eye movement for predictive purposes. These types of eye movements are known in the art.

At block 2025, the process determines an appropriate response to the eye movement. The responses may include altering the position of the display, altering the field of view, altering the resolution, altering depth data (which may depend on 3D gaze vector), altering the convergence point. The determination may be based on predicting a subsequent location of the user's gaze vector based on the eye movement classification.

At block 2030, the process determines whether the foveal display should be changed. If so, at block 2035, the foveal display is altered. As noted above, the alteration may include changes in position, field of view, resolution, etc.

At block 2040 the process determines whether the field display should be changed based on the analysis. If so, at block 2045 the field display is changed. In one embodiment, the field display may be changed by changing resolution, depth data, convergence point, etc. In one embodiment, the field display is not steerable, but other changes may be made.

At block 2050, the edges are blurred between the foveal display and the field display images. At block 2060 the hybrid image is displayed to the user. The process then returns to block 2015 to continue processing the next image. Note that this process, in one embodiment, occurs very quickly so that the evaluation is made for each frame prior to its display.

Figure 22:
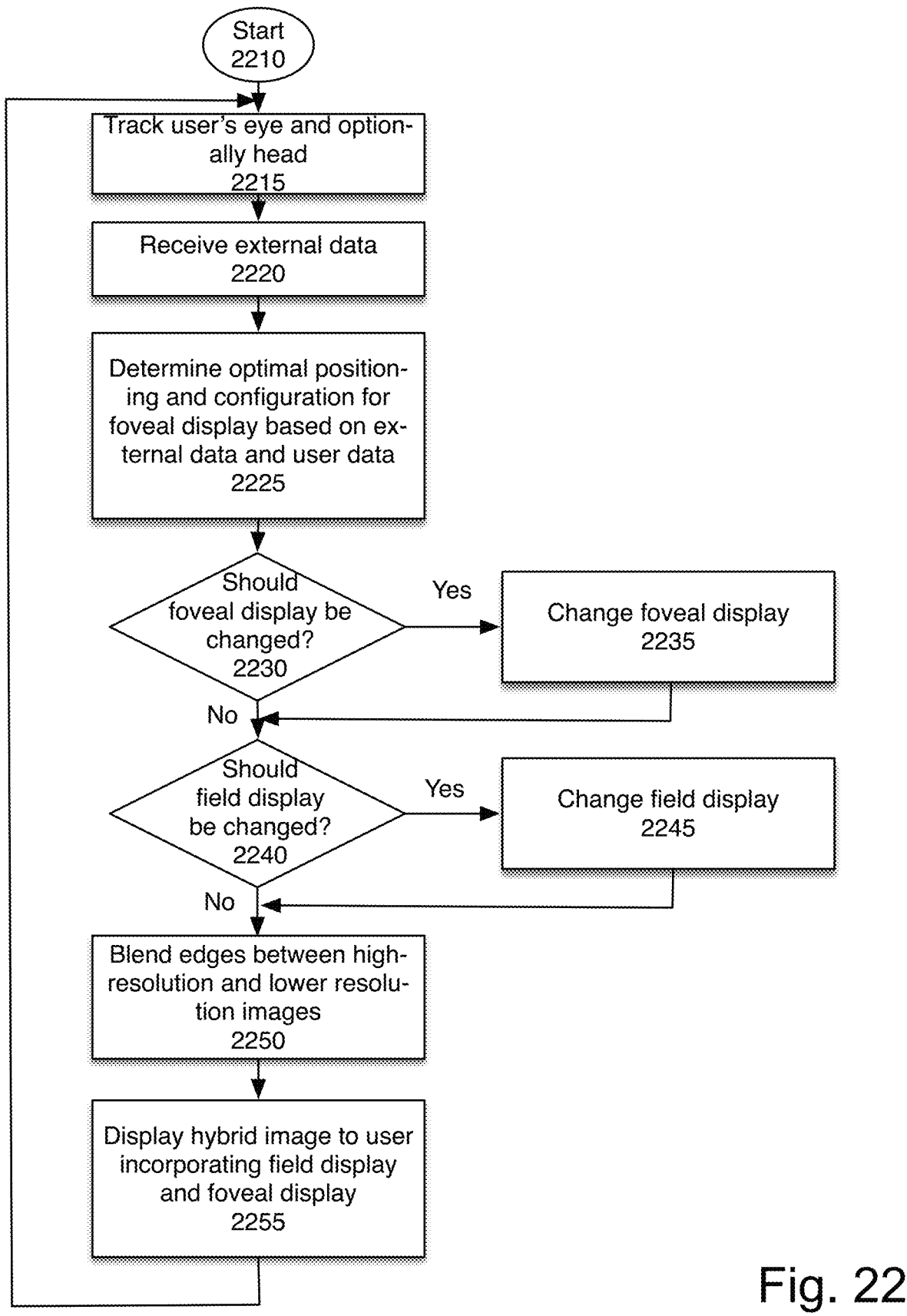
FIG. 22 is a flowchart of one embodiment of smart positioning.

FIG. 22 is a flowchart of one embodiment of smart positioning. The process starts at block 2210. This process may be used when a system is designed to utilize positioning not just based on the gaze vector of the user.

At block 2215, the user's eyes are tracked. In one embodiment, the user's head movement may also be tracked. This is useful in predicting the user's eye movements based on the vestibular ocular reflex. Head movement and eye movement may be combined to determine the position and orientation of each eye.

At block 2220, external data is received. This external data may include a highlighted element that should be shown in high resolution, using the foveal display, a location which the user's eyes should be guided, or another external factor. In one embodiment, the foveal display may be pointed to a relevant element that is not at the user's gaze vector. For example, when there is a dark screen and only one element of interest, the high resolution foveal display is best deployed at the interesting element. As another example, if the majority of the screen is deliberately blurry, but there is some portion with writing or other fine detail content, that may be the place to deploy the foveal display. Other reasons to position the display may be used.

At block 2225, the optimal positioning and configuration is determined for the foveal display based on external data and user data. As noted above, the user data includes the user's eye and head positioning. The external data is independent of the user, and reflects information about the frame being displayed, in one embodiment. In one embodiment, unless there is external data retargeting the foveal display, the default configuration is to position it at foveal center for the user. However, based on external information, this may be changed for certain frames and content.

At block 2230, the process determines whether the foveal display should be altered. The change may be a change in position, resolution, focal distance, etc. If so, at block 2235, the display is changed.

At block 2240, the process determines whether the field display portion should be altered. The change may be a change in resolution, brightness, contrast, etc. If so, at block 2245, the display is changed.

At block 2250, the edges between the foveal display and the field display images are blended, and at block 2255 the combination image is displayed. The process then returns to block 2215.

Although the above processes are illustrated in flowchart form, one of skill in the art would understand that this is done for simplicity. The order of the various elements need not remain the same, unless there is a dependency between the elements. For example, the adjustment of the foveal display and field displays may be done in any order. The tracking of the user's eyes and head may be done continuously. The system may receive external data when it is available, rather than continuously or at a particular time in the process. Other such adjustments to the flowcharts are within the scope of this invention.

Figure 23:
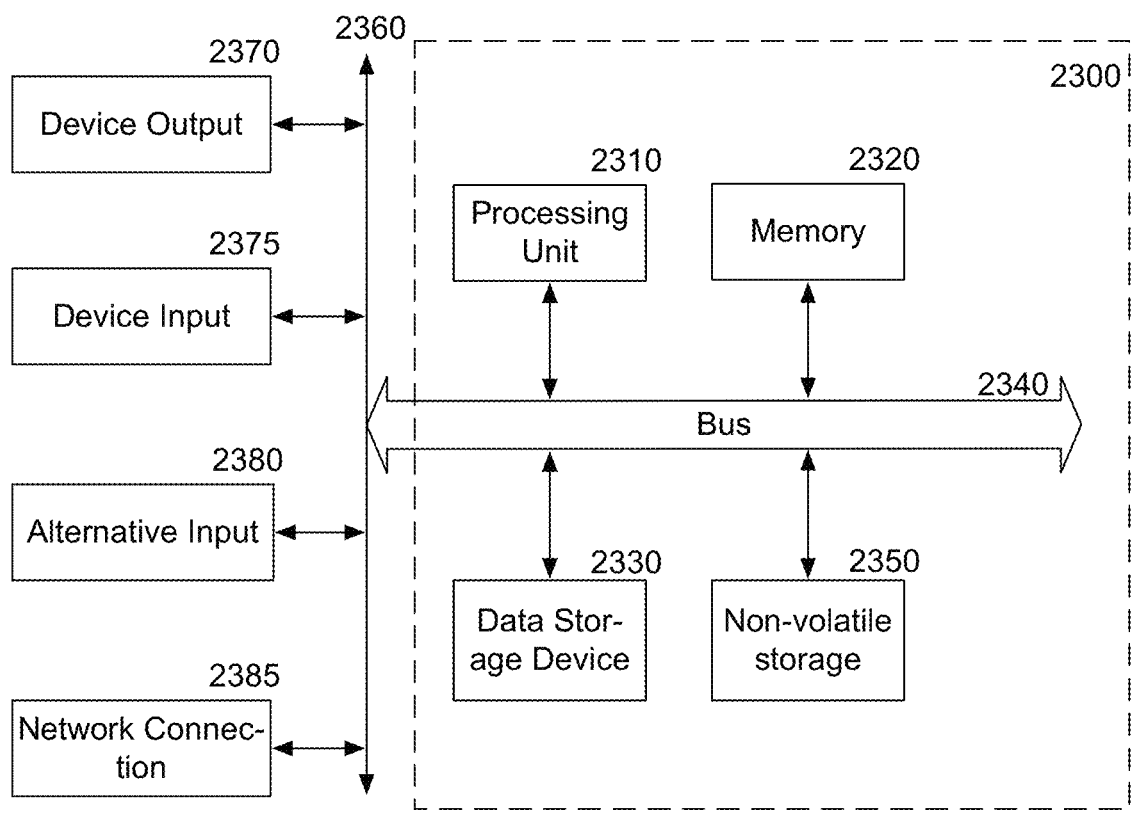
FIG. 23 is a block diagram of one embodiment of a computer system that may be used with the present invention.

FIG. 23 is a block diagram of one embodiment of a computer system that may be used with the present invention. It will be apparent to those of ordinary skill in the art, however that other alternative systems of various system architectures may also be used.

The data processing system illustrated in FIG. 23 includes a bus or other internal communication means 2340 for communicating information, and a processing unit 2310 coupled to the bus 2340 for processing information. The processing unit 2310 may be a central processing unit (CPU), a digital signal processor (DSP), or another type of processing unit 2310.

The system further includes, in one embodiment, a random access memory (RAM) or other volatile storage device 2320 (referred to as memory), coupled to bus 2340 for storing information and instructions to be executed by processor 2310. Main memory 2320 may also be used for storing temporary variables or other intermediate information during execution of instructions by processing unit 2310.

The system also comprises in one embodiment a read only memory (ROM) 2350 and/or static storage device 2350 coupled to bus 2340 for storing static information and instructions for processor 2310. In one embodiment, the system also includes a data storage device 2330 such as a magnetic disk or optical disk and its corresponding disk drive, or Flash memory or other storage which is capable of storing data when no power is supplied to the system. Data storage device 2330 in one embodiment is coupled to bus 2340 for storing information and instructions.

The system may further be coupled to an output device 2370, such as a cathode ray tube (CRT) or a liquid crystal display (LCD) coupled to bus 2340 through bus 2360 for outputting information. The output device 2370 may be a visual output device, an audio output device, and/or tactile output device (e.g. vibrations, etc.)

An input device 2375 may be coupled to the bus 2360. The input device 2375 may be an alphanumeric input device, such as a keyboard including alphanumeric and other keys, for enabling a user to communicate information and command selections to processing unit 2310. An additional user input device 2380 may further be included. One such user input device 2380 is cursor control device 2380, such as a mouse, a trackball, stylus, cursor direction keys, or touch screen, may be coupled to bus 2340 through bus 2360 for communicating direction information and command selections to processing unit 2310, and for controlling movement on display device 2370.

Another device, which may optionally be coupled to computer system 2300, is a network device 2385 for accessing other nodes of a distributed system via a network. The communication device 2385 may include any of a number of commercially available networking peripheral devices such as those used for coupling to an Ethernet, token ring, Internet, or wide area network, personal area network, wireless network or other method of accessing other devices. The communication device 2385 may further be a null-modem connection, or any other mechanism that provides connectivity between the computer system 2300 and the outside world.

Note that any or all of the components of this system illustrated in FIG. 23 and associated hardware may be used in various embodiments of the present invention.

It will be appreciated by those of ordinary skill in the art that the particular machine that embodies the present invention may be configured in various ways according to the particular implementation. The control logic or software implementing the present invention can be stored in main memory 2320, mass storage device 2330, or other storage medium locally or remotely accessible to processor 2310.

It will be apparent to those of ordinary skill in the art that the system, method, and process described herein can be implemented as software stored in main memory 2320 or read only memory 2350 and executed by processor 2310. This control logic or software may also be resident on an article of manufacture comprising a computer readable medium having computer readable program code embodied therein and being readable by the mass storage device 2330 and for causing the processor 2310 to operate in accordance with the methods and teachings herein.

The present invention may also be embodied in a handheld or portable device containing a subset of the computer hardware components described above. For example, the handheld device may be configured to contain only the bus 2340, the processor 2310, and memory 2350 and/or 2320.

The handheld device may be configured to include a set of buttons or input signaling components with which a user may select from a set of available options. These could be considered input device #1 2375 or input device #2 2380. The handheld device may also be configured to include an output device 2370 such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above, such as a kiosk or a vehicle. For example, the appliance may include a processing unit 2310, a data storage device 2330, a bus 2340, and memory 2320, and no input/output mechanisms, or only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism. In one embodiment, the device may not provide any direct input/output signals, but may be configured and accessed through a website or other network-based connection through network device 2385.

It will be appreciated by those of ordinary skill in the art that any configuration of the particular machine implemented as the computer system may be used according to the particular implementation. The control logic or software implementing the present invention can be stored on any machine-readable medium locally or remotely accessible to processor 2310. A machine-readable medium includes any mechanism for storing information in a form readable by a machine (e.g. a computer). For example, a machine readable medium includes read-only memory (ROM), random access memory (RAM), magnetic disk storage media, optical storage media, flash memory devices, or other storage media which may be used for temporary or permanent data storage. In one embodiment, the control logic may be implemented as transmittable data, such as electrical, optical, acoustical or other forms of propagated signals (e.g. carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A display system to display an image, the display system comprising:
   a display to project a portion of the image, the display having a monocular field of view of at least 1 degree;
   an optical steering element to move the image portion to one of a plurality of positions;
   wherein the display generates a plurality of image portions to be displayed at the plurality of positions within a field of view;
   the image including a foveal image and a field image, the foveal image having a higher resolution than the field image, and the image designed to be perceived as a single image;
   wherein the foveal image is moveable within the image, and is positioned in a selected location within the image; and
   wherein the field image has a spatially variable pixel density over the field of view.

2. The display system of claim 1, wherein
   a combination of the foveal image and the field display image provides a binocular field of view of at least 60 degrees, and a resolution of at least 0.02 degrees per pixel in a gaze direction.

3. The display system of claim 1, further comprising the optical steering elements designed to physically move a portion of the display system.

4. The display system of claim 1, wherein the optical steering element includes one or more of: an adjustable mirror, a tunable prism, an acousto-optical modulator, an adjustable display panel, a curved mirror, a polarization selective mirror, a diffractive element, and/or a Fresnel reflector.

5. The display system of claim 1, wherein the display is turned off during movement.

6. The display system of claim 1, further comprising: a light source for the display system comprising a microLED.

7. A display system comprising:
   a display to project a plurality of image portions;
   a steering element designed to move each of the plurality of image portions to one of a plurality of positions within a field of view, the plurality of image portions to create an image comprising a foveal image and a field image;
   wherein the foveal image is moveable within the image, and is positioned in a selected location within the image; and
   wherein the field image created by the display has a spatially variable pixel density, and the foveal image has a higher resolution than the field image.

8. The display system of claim 7, wherein:
   a combination of the foveal image and the field image provides a hybrid image with a binocular field of view of at least 60 degrees, and a resolution of at least 0.02 degrees per pixel in the foveal display area.

9. The display system of claim 7, wherein the steering element comprises one or more of: an adjustable mirror, a tunable prism, an acousto-optical modulator, an adjustable display panel, a curved mirror, a polarization selective mirror, a diffractive element, and/or a Fresnel reflector.

10. The display system of claim 7, wherein the moveable display is turned off during the moving.

11. The display system of claim 7, further comprising: a light source for the display system comprising a microLED.

12. A hybrid display system comprising: a display panel to display an image portion;
- a steering element to move the image portion to one of a plurality of positions within a field of view, and output light from the display panel to a user;
- wherein the display panel displays a plurality of image portions and the steering element moves each of the plurality of image portions to one of the plurality of positions;
- the light from the plurality of image portions from the display panel generating a hybrid image including a field image having a first resolution, and a foveal image having a second resolution, the second resolution higher than the first resolution;
- wherein the foveal image is positioned in a selected location within the hybrid image, and the foveal image and the field image have a variable pixel density; and
- wherein the display panel, by switching rapidly between image portions, displays the hybrid image in a time multiplexed way so that both the field image and the foveal image are simultaneously perceived by the user.

13. The display system of claim 12, wherein a combination of the foveal image and the field image provides a binocular field of view of at least 60 degrees, and a resolution of at least 0.02 degrees per pixel in the gaze direction.

14. The display system of claim 12, wherein the steering element comprises one or more steering elements.

15. The display system of claim 14, wherein the one or more steering elements include one or more of: an adjustable mirror, a tunable prism, an acousto-optical modulator, an adjustable display panel, a curved mirror, a polarization selective mirror, a diffractive element, and/or a Fresnel reflector.

16. The display system of claim 12, wherein the display panel is turned off during the moving.

17. The display system of claim 12, further comprising: a light source for the display panel comprising a microLED.

* * * * *